(12) United States Patent
Vassilovski et al.

(10) Patent No.: US 11,614,510 B2
(45) Date of Patent: Mar. 28, 2023

(54) DISTANCE-LIMITED SIDELINK-BASED POSITIONING

(71) Applicant: QUALCOMM Incorporated, San Diego, CA (US)

(72) Inventors: Dan Vassilovski, Del Mar, CA (US); Hong Cheng, Basking Ridge, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/333,667

(22) Filed: May 28, 2021

(65) Prior Publication Data

US 2022/0381873 A1   Dec. 1, 2022

(51) Int. Cl.

| | |
|---|---|
| H04W 76/15 | (2018.01) |
| G01S 5/02 | (2010.01) |
| H04W 64/00 | (2009.01) |
| H04L 5/00 | (2006.01) |
| H04W 76/14 | (2018.01) |
| H04W 4/40 | (2018.01) |

(52) U.S. Cl.
CPC ............ *G01S 5/0289* (2013.01); *H04L 5/005* (2013.01); *H04W 64/003* (2013.01); *H04W 76/14* (2018.02); *H04W 76/15* (2018.02); *H04W 4/40* (2018.02)

(58) Field of Classification Search
CPC .... G01S 5/0289; H04L 5/005; H04W 64/003; H04W 76/14; H04W 76/15; H04W 4/40
USPC ........................................................ 455/456.1
See application file for complete search history.

(56) References Cited

U.S. PATENT DOCUMENTS

| | | | |
|---|---|---|---|
| 2021/0297216 A1* | 9/2021 | Shreevastav | G01S 1/20 |
| 2022/0132463 A1* | 4/2022 | Cha | H04B 17/27 |
| 2022/0236365 A1* | 7/2022 | Ko | G01S 5/0244 |

FOREIGN PATENT DOCUMENTS

WO   WO-2019197036 A1 * 10/2019 ........... G01S 5/0072

\* cited by examiner

*Primary Examiner* — Hirdepal Singh
(74) *Attorney, Agent, or Firm* — Danai Nelisile Mhembere; Holland & Hart LLP

(57) ABSTRACT

Methods, systems, and devices for wireless communications are described. In a wireless communications system, one or more user equipments (UEs) may implement distance-limited sidelink-based ranging techniques. An initiating UE may transmit one or more positioning reference signal (PRS) request messages to one or more target UEs via a sidelink channel. In some cases, the initiating UE may receive one or more response messages from at least one target UE that is located within a threshold distance from the initiating UE. In some examples, based on receiving the one or more response messages, the initiating UE may transmit PRSs to each target UE that transmitted a response message.

29 Claims, 17 Drawing Sheets

DISTANCE-LIMITED SIDELINK-BASED POSITIONING

FIELD OF TECHNOLOGY

The following relates to wireless communications, including distance-limited sidelink-based positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A UE may implement techniques for sidelink-based positioning in sidelink communications with one or more other UEs. Techniques to improve sidelink-based positioning may be deficient.

SUMMARY

The described techniques relate to improved methods, systems, devices, and apparatuses that support distance-limited sidelink-based positioning. Generally, the described techniques provide for distance-limited sidelink-based ranging using sidelink signaling. Sidelink-based ranging may function via a handshake (e.g., a two-way handshake or a three-way handshake) for session establishment. For example, two or more wireless communications devices may initiate in a multi-step process to exchange synchronization and acknowledgement messages to establish a connection for data communication. The handshake may be followed by an exchange of positioning reference signals (PRSs) which the one or more wireless communications devices may use to determine relative and absolute positioning.

According to aspects described herein, an initiating user equipment (UE) may initiate a sidelink ranging session by transmitting a request (e.g., PRSrequest) to one or more target UEs including information relevant to establish a sidelink ranging session. For example, the request may include a specified distance of interest (e.g., a threshold distance) and the initiating UE may engage in ranging with target UEs located within the threshold distance. In some cases, one or more target UEs may respond with information further relevant to establishing the sidelink ranging session (e.g., PRSresponse). The initiating UE may then respond with a confirmation (e.g., PRSconfirmation).

In some cases, the initiating UE may enforce the threshold distance by excluding any responses from UEs beyond the threshold distance. For example, multiple target UEs (e.g., all target UEs that receive the request) may transmit responses to the initiating UE (e.g., regardless of whether the target UEs are located within the threshold distance or outside of the threshold distance. The initiating UE may transmit a confirmation to the target UEs located within the threshold distance, but may refrain from transmitting a confirmation to the target UEs outside of the threshold distance.

In some cases, the target UEs may enforce the threshold distance by responding to a request from the initiating UE if the target UEs are located within the threshold distance. In such examples, the initiating UE may include an indication of the threshold distance in the request. If a target UE is located outside of the threshold distance, the target UEs may refrain from responding to the request. Thus, the initiating UE may determine that all target UEs that respond to the request with responses are located within the threshold distance, and may transmit confirmations to each of the responding target UEs.

Having determined which target UEs are located within the threshold distance during the handshake, the initiating UE and the target UEs located within the threshold distance may exchange PRSs, and perform ranging procedures. The handshaking messages (e.g., PRSrequest, PRSresponse, and PRSconfirmation) may be used to establish criteria for transmission of wideband PRSs of UEs participating in the sidelink based positioning procedure. This exchange may be concluded with a measurement message exchange (e.g., postPRS) in which the one or more wireless communications devices performing position based measurements relating to the other participating UEs and share the information regarding relative positioning. Thus, once each UE transmits (broadcasts) its PRS, the receiving UEs may perform measurements and incorporate the measurements into the post-PRS signaling message (e.g., last signaling message).

A method for wireless communications at an initiating UE is described. The method may include transmitting, to a set of multiple target UEs, one or more PRS request messages via a sidelink channel, receiving, from at least a first subset of the set of multiple target UEs located within a threshold distance from the initiating UE, one or more PRS response messages via the sidelink channel, and transmitting, via the sidelink channel, one or more first PRSs to each target UE in the first subset based on receiving the one or more PRS response messages from the first subset.

An apparatus for wireless communications at an initiating UE is described. The apparatus may include a processor, memory coupled with the processor, and instructions stored in the memory. The instructions may be executable by the processor to cause the apparatus to transmit, to a set of multiple target UEs, one or more PRS request messages via a sidelink channel, receive, from at least a first subset of the set of multiple target UEs located within a threshold distance from the initiating UE, one or more PRS response messages via the sidelink channel, and transmit, via the sidelink channel, one or more first PRSs to each target UE in the first subset based on receiving the one or more PRS response messages from the first subset.

Another apparatus for wireless communications at an initiating UE is described. The apparatus may include means for transmitting, to a set of multiple target UEs, one or more PRS request messages via a sidelink channel, means for receiving, from at least a first subset of the set of multiple target UEs located within a threshold distance from the initiating UE, one or more PRS response messages via the sidelink channel, and means for transmitting, via the sidelink channel, one or more first PRSs to each target UE in the first subset based on receiving the one or more PRS response messages from the first subset.

A non-transitory computer-readable medium storing code for wireless communications at an initiating UE is described. The code may include instructions executable by a processor to transmit, to a set of multiple target UEs, one or more PRS request messages via a sidelink channel, receive, from at least a first subset of the set of multiple target UEs located within a threshold distance from the initiating UE, one or more PRS response messages via the sidelink channel, and transmit, via the sidelink channel, one or more first PRSs to each target UE in the first subset based on receiving the one or more PRS response messages from the first subset.

In some examples of the method, apparatuses, and non-transitory computer-readable medium described herein, receiving the one or more PRS response messages may include operations, features, means, or instructions for receiving the one or more PRS response messages each including location information for a respective target UE of the set of multiple target UEs.

In some examples of the method, apparatuses, and non-transitory computer-readable medium described herein, transmitting the one or more first PRSs to the first subset of the set of multiple target UEs may include operations, features, means, or instructions for transmitting a PRS to a respective target UE in the first subset that may be each determined to be located within the threshold distance based on the location information indicated in the one or more PRS response messages.

In some examples of the method, apparatuses, and non-transitory computer-readable medium described herein, receiving the one or more PRS response messages may include operations, features, means, or instructions for receiving the one or more PRS response messages including the location information that indicates a zone identifier for a respective target UE.

In some examples of the method, apparatuses, and non-transitory computer-readable medium described herein, receiving the one or more PRS response messages may include operations, features, means, or instructions for receiving the one or more PRS response messages including the location information that indicates a global positioning system coordinate for a respective target UE, one or more mobility parameters for the respective target UE, or any combination thereof.

In some examples of the method, apparatuses, and non-transitory computer-readable medium described herein, transmitting the one or more PRS request messages may include operations, features, means, or instructions for transmitting one or more PRS request messages including an indication of the threshold distance from the initiating UE.

In some examples of the method, apparatuses, and non-transitory computer-readable medium described herein, receiving the one or more PRS response messages may include operations, features, means, or instructions for receiving, from the first subset of the set of multiple target UEs, the one or more PRS response messages based on each target UE in the first subset being located within the threshold distance from the initiating UE.

In some examples of the method, apparatuses, and non-transitory computer-readable medium described herein, the indication of the threshold distance may include operations, features, means, or instructions for a zone identifier for a geographical area, an indication of one or more zones within the threshold distance, a spatial distance, or any combination thereof.

In some examples of the method, apparatuses, and non-transitory computer-readable medium described herein, the indication of the threshold distance may include operations, features, means, or instructions for a global positioning system coordinate, one or more mobility parameters for the initiating UE, a radius value, a physical address based on a map location, one or more map coordinates, or any combination thereof.

In some examples of the method, apparatuses, and non-transitory computer-readable medium described herein, receiving the one or more PRS response messages may include operations, features, means, or instructions for receiving the one or more PRS response messages from the first subset of the set of multiple target UEs that may be each located within the threshold distance from the initiating UE and a second subset of the set of multiple target UEs that may be each located outside of the threshold distance from the initiating UE.

In some examples of the method, apparatuses, and non-transitory computer-readable medium described herein, transmitting the one or more first PRSs to the first subset of the set of multiple target UEs may include operations, features, means, or instructions for transmitting a PRS to a respective target UE in the first subset of the set of multiple target UEs that may be each located within the threshold distance from the initiating UE.

In some examples of the method, apparatuses, and non-transitory computer-readable medium described herein, transmitting the one or more PRS request messages may include operations, features, means, or instructions for transmitting a broadcast sidelink message including the one or more PRS request messages to the set of multiple target UEs.

Some examples of the method, apparatuses, and non-transitory computer-readable medium described herein may further include operations, features, means, or instructions for transmitting, to the first subset based on receiving the one or more PRS response messages, one or more PRS confirmation messages, where transmitting the one or more first PRSs may be based on transmitting the one or PRS confirmation messages.

In some examples of the method, apparatuses, and non-transitory computer-readable medium described herein, transmitting the one or more PRS request messages may include operations, features, means, or instructions for transmitting a set of multiple unicast sidelink messages including the one or more PRS request messages to respective target UEs of the set of multiple target UEs.

Some examples of the method, apparatuses, and non-transitory computer-readable medium described herein may further include operations, features, means, or instructions for receiving one or more second PRSs from each target UE in the first subset in response to transmitting the one or more first PRSs.

A method for wireless communications at a target UE is described. The method may include receiving, from an initiating UE via a sidelink channel, a PRS request message including an indication of a threshold distance from the initiating UE, transmitting, to the initiating UE via the sidelink channel based on the target UE being located within the threshold distance from the initiating UE, a PRS response message, and receiving, via the sidelink channel, one or more first PRSs based on transmitting the v response message.

An apparatus for wireless communications at a target UE is described. The apparatus may include a processor, memory coupled with the processor, and instructions stored in the memory. The instructions may be executable by the processor to cause the apparatus to receive, from an initiating UE via a sidelink channel, a PRS request message including an indication of a threshold distance from the initiating UE, transmit, to the initiating UE via the sidelink channel based on the target UE being located within the threshold distance from the initiating UE, a PRS response message, and receive, via the sidelink channel, one or more first PRSs based on transmitting the PRS response message.

Another apparatus for wireless communications at a target UE is described. The apparatus may include means for receiving, from an initiating UE via a sidelink channel, a PRS request message including an indication of a threshold distance from the initiating UE, means for transmitting, to the initiating UE via the sidelink channel based on the target UE being located within the threshold distance from the initiating UE, a PRS response message, and means for receiving, via the sidelink channel, one or more first PRSs based on transmitting the PRS response message.

A non-transitory computer-readable medium storing code for wireless communications at a target UE is described. The code may include instructions executable by a processor to receive, from an initiating UE via a sidelink channel, a PRS request message including an indication of a threshold distance from the initiating UE, transmit, to the initiating UE via the sidelink channel based on the target UE being located within the threshold distance from the initiating UE, a PRS response message, and receive, via the sidelink channel, one or more first PRSs based on transmitting the PRS response message.

Some examples of the method, apparatuses, and non-transitory computer-readable medium described herein may further include operations, features, means, or instructions for transmitting one or more second PRSs to the initiating UE in response to receiving the one or more first PRSs.

Some examples of the method, apparatuses, and non-transitory computer-readable medium described herein may further include operations, features, means, or instructions for receiving, from the initiating UE based on transmitting the PRS response message, a PRS confirmation message, where receiving the one or more first PRSs may be based on receiving the PRS confirmation message.

In some examples of the method, apparatuses, and non-transitory computer-readable medium described herein, receiving the PRS request message including the indication of the threshold distance from the initiating UE may include operations, features, means, or instructions for receiving an indication of a zone identifier for a geographical area in which the initiating UE may be located, an indication of one or more zones, a spatial distance, or any combination thereof.

In some examples of the method, apparatuses, and non-transitory computer-readable medium described herein, receiving the PRS request message including the indication of the threshold distance from the initiating UE may include operations, features, means, or instructions for a global positioning system coordinate for the initiating UE, one or more mobility parameters for the initiating UE, a radius value, a physical address based on a map location, one or more map coordinates, or any combination thereof.

Some examples of the method, apparatuses, and non-transitory computer-readable medium described herein may further include operations, features, means, or instructions for receiving, from a second initiating UE via a sidelink channel, a PRS request message including an indication of a threshold distance from the second initiating UE and refraining from transmitting a PRS response message based on the target UE not being located within the threshold distance from the second initiating UE.

DETAILED DESCRIPTION

Figure 1:
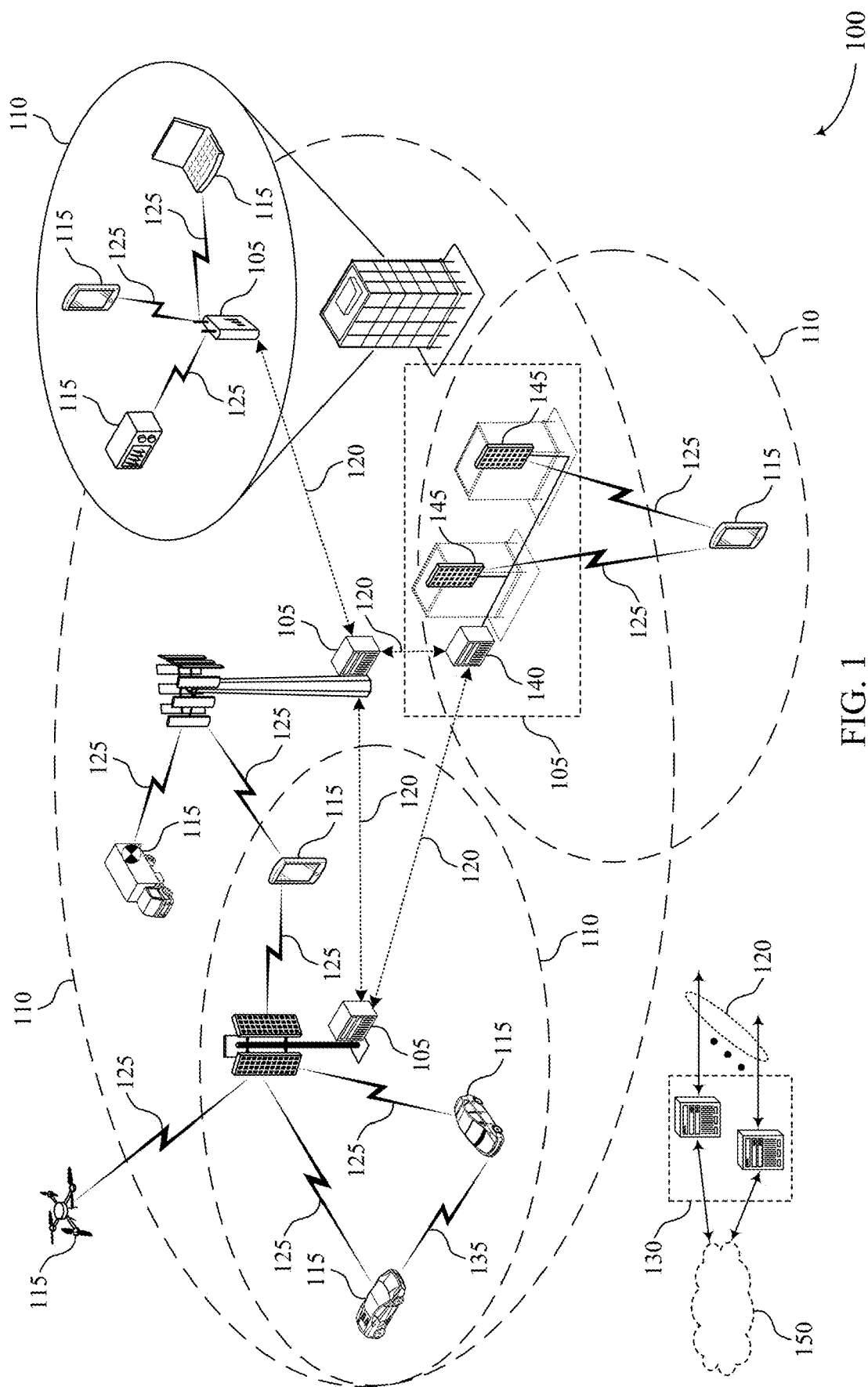
FIG. 1 illustrates an example of a wireless communications system that supports distance-limited sidelink-based positioning in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X), cellular vehicle-to-everything (CV2X), or vehicle-to-vehicle (V2V) communications, industrial settings, message relaying, discovery signaling, beacon signaling, or other signals transmitted over-the-air from one UE to one or more other UEs.

Sidelink communications may support communications within a group of UEs. For example, sidelink communications may include communications between a UE and one or more other UEs located within a coverage area. In some examples, the coverage area may include the group of UEs (e.g., a coverage area provided by a base station, a coverage area outside of the coverage area provided by the base station, or a combination thereof). One or more of the UEs in the group of UEs (e.g., an initiating UE) may initiate sidelink communications with other UEs in the group of UEs (e.g., target UEs). The initiating UE may initiate in sidelink-based ranging techniques which enable the initiating UE to determine a relative distance and absolute position of the one or more wireless devices (e.g., target UEs). In some examples, wireless communications devices may use sidelink-based ranging positioning techniques to enhance range and position accuracy. Sidelink UEs may perform a handshake (e.g., a three-way handshake) for session establishment, (PRSs) (e.g., PRSrequest, PRSresponse, and PRSconfirmation), followed by an exchange of positioning reference signals (PRSs), and concluded with messaging (e.g., postPRS) to exchange positioning measurements based on the multiple PRS transmissions.

In some cases, a wireless device (e.g., an initiating UE) may trigger a sidelink ranging session by broadcasting, via a sidelink connection to a set of target UEs, a request to other wireless devices (e.g., target UEs) in the vicinity of the initiating UE. The initiating UE may indicate which target UEs it wishes to participate in the session. If the initiating UE lacks knowledge about what other UEs are in its vicinity, or if the UEs in the vicinity of the initiating UE are moving (e.g., if the UEs are vehicles), the initiating UE may broadcast a general request to solicit participant target UEs, and as such, the initiating UE may refrain from using prior knowledge of target UEs. However, without a distance constraint enforced, all UEs located within the reception range of the request broadcasted by the initiating UE may participate in the sidelink ranging session. In some cases, the initiating UE may receive a large number of responses to the request from target UEs, including responses from UEs too distant to benefit from the initiating UE's sidelink ranging session. For instance, a sidelink UE in a V2X or CV2X deployment may receive responses from other vehicles on distant or non-adjacent roads (e.g., ranging information for parked vehicles, idle vehicles, or vehicles on nearby but dis-connected streets may be irrelevant to safety or other ranging-related procedures), a UE in a home, office, or security setting may receive responses from UEs located outside of the premises, a UE in an industrial deployment may receive responses from personal UEs or UEs that are part of a neighboring but unrelated deployment, or the like. In any case, performing ranging procedures for all receptive UEs, regardless of whether they are outside of a distance of interest, may result in inefficient or unnecessary expenditure of computational resources, increased power expenditures and delays, increased system latency, and decreased user experience.

According to one or more aspects of the present disclosure, wireless communications devices may use a sidelink connection to initiate distance-limited sidelink-based ranging with multiple target wireless communications devices. The initiating UE may perform a three-way handshake (e.g., including the PRS request message, the PRS response message, and PRS confirmation message), a two-way handshake (e.g., in cases where no PRS response message is received), or a simple PRS request message followed by transmissions of PRSs from participants satisfying a distance threshold. For example, an initiating UE may initiate a sidelink ranging session by transmitting PRS request messages to the target UEs, and may specify a distance of interest (e.g., a threshold distance, a radius round the initiating UE) for which the initiating UE may engage in ranging with target UEs. In some examples, the target UEs located within the threshold distance may participate in the sidelink ranging session, while the target UEs outside of the threshold distance may refrain from participating in the sidelink ranging session.

In some cases, the initiating UE may enforce the threshold distance by excluding any responses (e.g., PRSresponses) from UEs beyond the threshold distance. The initiating UE may transmit PRS confirmation messages to the target UEs located within the threshold distance, and may refrain from transmitting PRS confirmation messages to the target UEs outside of the threshold distance. For example, the initiating UE may specify the threshold distance at the Application (App) layer. Upon receiving responses from the target UEs, the initiating UE may determine if a received PRS exceeds the specified distance at the Physical (PHY) layer or the medium access control (MAC) layer. If a received response from a target UE indicates that the target UE is located within the threshold distance, then the PHY-MAC layer may pass the received response to the App layer. However, if the received response from the target UE indicates that the target UE is not located within the threshold distance, then the PHY-MAC layer may not pass the response to the App layer (e.g., may discard the response).

In some cases, the target UEs may enforce the threshold distance. For instance, a target UE may respond to a request for a sidelink ranging session from the initiating UE if the target UE is located within the threshold distance. If the target UEs are outside of the threshold distance, they may refrain from responding to the request.

UEs supporting distance-limited sidelink-based ranging in sidelink communications systems may utilize the techniques described herein to experience power savings and extended battery life while ensuring reliable and efficient communications in the group of UEs. Particular aspects of the subject matter described in this disclosure may be implemented to support high reliability and low latency communications, among other examples. The described techniques may thus include features for improvements to power consumption, spectral efficiency, higher data rates and, in some examples, may promote efficiency for high reliability and low latency operations, among other benefits.

Aspects of the disclosure are initially described in the context of wireless communications systems. Aspects of the disclosure are then described in the context of flow diagrams and process flows. Aspects of the disclosure are further illustrated by and described with reference to apparatus diagrams, system diagrams, and flowcharts that relate to distance-limited sidelink-based positioning.

FIG. 1 illustrates an example of a wireless communications system 100 that supports distance-limited sidelink-based positioning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, an initiating UE 115 may use a sidelink connection to initiate distance-limited sidelink-based ranging with multiple target UEs 115. For example, the initiating UE 115 may initiate a sidelink ranging session by transmitting PRS request messages to the target UEs 115, and may specify a distance of interest (e.g., a threshold distance such as a radius round the initiating UE 115) for which the initiating UE 115 may engage in ranging with target UEs 115. In some examples, the target UEs 115 located within the threshold distance may participate in the sidelink ranging session, while the target UEs 115 outside of the threshold distance may refrain from participating in the sidelink ranging session. In some cases, the initiating UE 115 may enforce the threshold distance by excluding any responses (e.g., PRSs) from UEs 115 beyond the threshold distance. The initiating UE 115 may transmit PRS confirmation messages to the target UEs 115 located within the threshold distance, but refrain from transmitting a PRS confirmation message to the target UEs 115 outside of the threshold distance. For example, the App layer at the initiating UE 115 may specify the threshold distance, and the PHY layer and the MAC layer at the initiating UE 115 may determine if a received PRS response exceeds the specified threshold distance. In some cases, the target UEs 115 may enforce the threshold distance by responding to a request for a sidelink ranging session from the initiating UE 115 if the target UEs 115 are located within the threshold distance. If the target UEs 115 are outside of the threshold distance, they may refrain from responding to the request. In some cases, the initiating UE 115 and the target UEs 115 may enforce the threshold distance independently or jointly.

Figure 2:
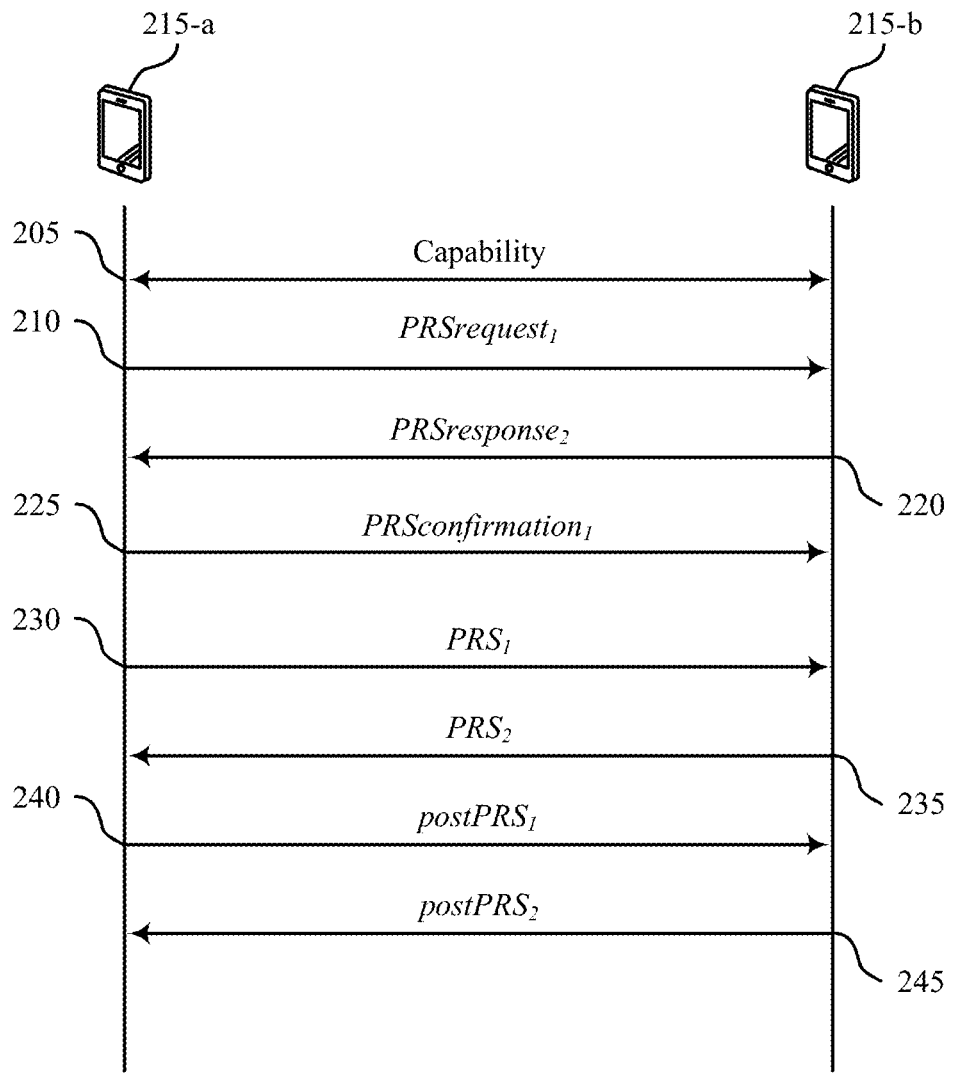
FIG. 2 illustrates an example of a process flow in accordance with aspects of the present disclosure.

FIG. 2 illustrates an example of a process flow 200 that supports distance-limited sidelink-based positioning in accordance with aspects of the present disclosure. In some examples, the process flow may implement or be implemented by aspects of wireless communications system 100. For example, the process flow 200 may illustrate operations between a UE 215-*a* and a UE 215-*b*, which may be examples of a UE 115 as described with reference to FIG. 1. In the following description of the process flow 200, the operations between the UE 215-*a* and the UE 215-*b* may be transmitted in a different order than the example order shown, or the operations performed by the UE 215-*a* and the UE 215-*b* may be performed in different orders or at different times. Some operations may also be omitted from the process flow 200, and other operations may be added to the process flow 200.

A wireless communications system (e.g., a wireless communications system 100 as described with reference to FIG. 1) may support access link and sidelink communications between one or more communication devices. An access link may refer to a communication link between a UE 215 (e.g., the UE 215-*a* or the UE 215-*b*) and a base station. A sidelink may refer to any communication link between similar wireless devices (e.g., a communication link between the UEs 215). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE 215 to one or more other UEs 215.

As depicted in the example of FIG. 2, the UE 215-*a* and the UE 215-*b* may communicate with each other over sidelink communications (e.g., using a peer-to-peer (P2P) or D2D protocol). In some cases, the UEs 215 may establish the sidelink communications via sidelink communications links. One of the UEs 215 may initiate sidelink communications with the other UE 215. In some examples, the UEs 215 may utilize sidelink communications to perform sidelink-based ranging techniques which may determine a relative distance and an absolute position for one or more of the UEs 215. In some examples, the UEs 215 may use sidelink-based ranging positioning techniques in cases in which other wireless positioning methods (e.g., Global Navigation Satellite System (GNSS)) are unavailable (e.g., due to presence of tunnels, urban canyons), or to enhance the range and position accuracy of GNSS when GNSS is available.

In some examples, the UEs 215 may perform sidelink-based ranging using a handshake (e.g., a three-way handshake) for session establishment, followed by exchange of wideband PRSs, and concluded with a messaging (e.g., postPRS) to exchange measurements based on PRS transmission and receipt from peer UEs. In some examples, the UE 215-*a* may act as an initiating UE and may thus initiate a three-way messaging handshake used to establish conditions for transmission with the UE 215-*b* (e.g., a target UE). At 205, the UE 215-*a* and the UE 215-*b* may exchange capability information (e.g., that the UEs 215 may be capable of supporting sidelink-based ranging). In some cases, the UE 215-*a*, the UE 215-*b*, or both may issue a request for a range around the UE 215-*a*. At 210, the UE 215-*a* may transmit a request message (e.g., $PRSrequest_1$) to the UE 215-*b*. At 220, the UE 215-*b* may transmit a unicast response message (e.g., $PRSresponse_2$) back to the UE 215-*a*.

At 225, the UE 215-*a* may respond to the UE 215-*b* using a unicast confirmation message (e.g., $PRSconfirmation_1$). By way of example, after a messaging handshake, the UE 215 may participate in the distance-limited sidelink-based ranging session (e.g., as described in greater detail with reference to FIGS. 4-6), and may broadcast PRS messages to the other UEs 215. For example, at 230, the UE 215-*a* may transmit a message (e.g., $PRS_1$) to the UE 215-*b*, and at 235, the UE 215-*b* may transmit a message (e.g., $PRS_2$) to the UE 215-*a*. exchanging (e.g., broadcasting) PRS signals, the UEs 215 may exchange postPRS with measurements of the received PRS signals. For example, at 240, the UE 215-*a* may transmit a post PRS message (e.g., $postPRS_1$) to the UE 215-*b*, and at 245, the UE 215-*b* may transmit a post PRS message (e.g., $postPRS_2$) to the UE 215-*b*, where both post messages may be based on the measurements of the PRS messages. That is, the PRS message exchange between the UE 215-*a* and the UE 215-*b* may be concluded with a measurement message exchange (e.g., $postPRS_1$, $postPRS_2$) in which the UEs 215 may broadcast positioning related information to the other UE 215. In cases with N UEs 215 participating in the sidelink-based ranging, each of the participating UEs 215 may broadcast N-1 measurement results to the other UEs 215 (UEs 215 other than the UE 215-*a*) during a postPRS procedure, which is described in detail with reference to FIG. 3.

In some examples, each UE 215 participating in the sidelink-based ranging may calculate an inter-UE round trip time (RTT) from the N-1 measurements received during the postPRS between the two UEs 215. For example, a first UE 215 (e.g., the UE 215-*a*) may calculate the RTT between itself and a second UE 215 (e.g., UE 215-*b*) by determining the transmission times and reception times of the multiple wideband PRS messages that were communicated between the UE 215-*a* and the UE 215-*b*. In some cases, the UE 215-*a* may use the handshake to establish a sidelink ranging session after a capability exchange. The UEs 215 may exchange $postPRS_1$ and $postPRS_2$ and determine an RTT from local measurements and the measurements received in $postPRS_1$ and $postPRS_2$.

Each UE 215 may report both a measured RTT and its location, if known, to all other participating UEs 215. In some cases, a UE 215 may have limited or inaccurate knowledge of its position which may yield an inter-UE range. For example, if the UE 215-*a* has limited or inaccurate knowledge of its position, it may use the measurements acquired from the UE 215-*b* during the sidelink-based ranging session to determine a relative distance of the UE 215-*a* from the UE 215-*b* that participated in the sidelink-based ranging session. In some cases, the UEs 215 may have accurate knowledge of their positions which may yield an absolute position. For example, if UE 215-*a* has accurate knowledge of its position, the UE 215-*a* may use the measurements acquired from the UE 215-*b* during the sidelink-based ranging session to determine an absolute position.

In some examples, one or more UEs 215 may be outside of a threshold distance (e.g., a distance of interest) from the UE 215-*a*. In some examples, a UE 215 that is located outside the threshold distance may receive a PRS request (e.g., at 210). However, ranging procedures for such a UE 215 may not benefit the UE 215-a. For example, PRSs or postPRS messages may not provide information that is helpful to the UE 215-a, or relevant to the UE 215-a. In such examples, as described in greater detail with reference to FIGS. 4-7, the UE 215-a (e.g., the initiating UE) or the UE 215-b (e.g., the target UE), or both, may enforce a threshold distance limit on ranging procedures described with reference to FIGS. 2 and 3.

Figure 3:
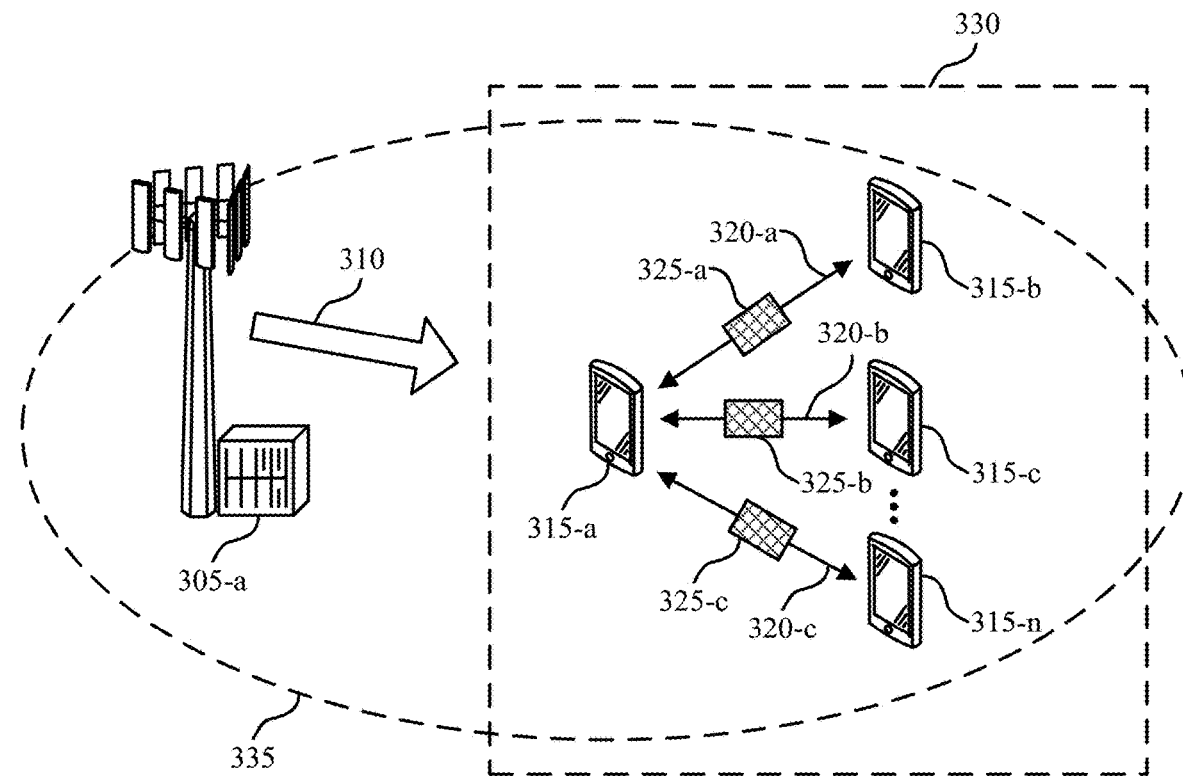
FIGS. 3 and 4 illustrate examples of wireless communications systems in accordance with aspects of the present disclosure.

FIG. 3 illustrates an example of a wireless communications system 300 that supports distance-limited sidelink-based positioning in accordance with aspects of the present disclosure. In some examples, the wireless communications system 300 may implement, or be implemented by, aspects of wireless communications system 100. The wireless communications system 300 includes a base station 305, which may be an example of a base station 105 as depicted in the example of FIG. 1, a coverage area 335 which may be an example of a geographic coverage area 110 as depicted in the example of FIG. 1, and one or more UEs 315, which may be examples of UEs 115 as depicted in the example of FIG. 1.

In some cases, the wireless communications system 300 may utilize control signaling to schedule resources for UEs 315 to perform sidelink communications. Additionally or alternatively, the UEs 315 in the wireless communications system 300 may utilize shared information to enhance scheduling, inter-UE coordination, and communications flexibility. In some examples, the group of UEs 315 may communicate with each other (e.g., within a V2X system, a D2D system, and the like) and may employ sidelink transmissions to save power, reduce latency, and ensure reliable communications.

The wireless communications system 300 may support access link and sidelink communications between one or more communication devices. An access link may refer to a communication link between a UE 315 (e.g., a UE 315-a, a UE 315-b, a UE 315-c, a UE 315-n) and the base station 305. A sidelink may refer to any communication link between similar wireless devices (e.g., a communication link between UEs 315, or a backhaul communication link between base stations 305). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE 315 to one or more other UEs 315.

Base station 305 may communicate with one or more UEs 315 which may be included within a UE group 330 (e.g., including the UE 315-a through the UE 315-n). For example, base station 305-a may transmit control information (via communication link 310) to the UE 315-a, the UE 315-b, the UE 315-c, or any combination thereof. In some examples, the base station 305-a may configure sidelink communication resources for the UE group 330 using a configuration message (e.g., semi-persistent scheduling configuration message). For example, the base station 305-a may communicate control signaling via communication link 310 indicating a resource allocation for one or more UEs 315 included in the UE group 330 which may be used for sidelink-based communications.

The UEs 315 included in the UE group 330 may communicate with each other (or with another group of UEs 315) over sidelink communications links 320 (e.g., using a peer-to-peer (P2P) or D2D protocol). In some cases, the UEs 315 in the UE group 330 may establish the sidelink communications via sidelink communications links 320 to one or more other UEs 315 in the UE group 330. In some examples, sidelink communications may support communications within a UE group 330. For example, sidelink communications may include communications between a UE 315 and other UEs 315 located within the coverage area 335 including the UE group 330 (e.g., the coverage area provided by a base station, a coverage area outside of the coverage area provided by the base station, or a combination thereof). One or more of the UEs 315 in the UE group 330 may initiate sidelink communications with other UEs 315 in the UE group 330. The UEs 315 may utilize sidelink communications to perform sidelink-based ranging techniques which may determine a relative distance and an absolute position for one or more of the UEs 315. Thus, sidelink-based ranging may enable determination of UE relative distance and absolute position. In some examples, UEs 315 may use sidelink-based ranging positioning techniques in cases in which other wireless positioning methods (e.g., GNSS) are unavailable (e.g., due to presence of tunnels, urban canyons), or to enhance the range and position accuracy of GNSS when GNSS is available.

In some examples, the UEs 315 may perform sidelink-based ranging using a handshake for session establishment, followed by exchange of PRSs, and concluded with a messaging (e.g., postPRS) to exchange measurements based on PRS transmission and receipt from peer UEs. As depicted in the example of FIG. 3, the UE 315-a may act as an initiating UE 315-a and may thus initiate a messaging handshake used to establish conditions for transmission with the other UEs 315 in the UE group 330 (e.g., the UE 315-b through the UE 315-n) of the PRS messages 325. For example, the initiating UE 315-a may broadcast a request message (e.g., PRSrequest) which may be directed to one or more target UEs 315 (e.g., the UE 315-b through the UE 315-n). Each UE 315 listed in the request message may transmit back a unicast response message (e.g., PRSresponse) to the initiating UE 315-a. The initiating UE 315-a may respond back individually to each UE 315 (e.g., each UE transmitting the response message) using a unicast confirmation message (e.g., PRSconfirmation).

By way of example, a messaging handshake may be followed with each UE 315 participating in the sidelink-based ranging session (e.g., the initiating UE 315-a through the UE 315-n) broadcasting PRS messages 325 to the other UEs 315. Subsequent to handshaking, UEs 315 may transmit (e.g., broadcast) PRS signals, and may exchange postPRS with measurements of the received PRS signals. That is, the PRS message exchange between the initiating UE 315-a and the one or more target UEs 315 may be concluded with a measurement message exchange (e.g., postPRS) in which the UEs 315 may broadcast positioning-related information to the other UEs 315 in UE group 330. For example, if there were N UEs 315 participating in the sidelink-based ranging, each of the participating UEs 315 may broadcast N-1 measurement results to the other UEs 315 (e.g., the UEs 315 other than the initiating UE 315-a) during a postPRS procedure. As depicted in the example of FIG. 3, the initiating UE 315-a may transmit and receive different PRS messages 325 (e.g., PRSrequest, PRSresponse, PRSconfirmation, postPRS) with the other UEs 315 via the sidelink communications links 320. For example, the initiating UE 315-a may transmit and receive PRS messages 325-a via a sidelink communications link 320-a with the UE 315-b, PRS messages 325-b via a sidelink communications link 320-b with the UE 315-c, and PRS messages 325-c via a sidelink communications link 320-c with the UE 315-n.

In some examples, each UE 315 participating in the sidelink-based ranging may calculate an inter-UE RTT from the N-1 measurements received during the postPRS between two UEs 315. For example, a first UE (e.g., the initiating UE 315-a) may calculate the RTT between itself and a second UE (e.g., the UE 315-b) by determining the transmission times and reception times of the multiple PRS messages 325 (e.g., wideband PRS messages) that were communicated between the first UE 315 (e.g., the initiating UE 315-a) and the second UE 315 (e.g., the UE 315-b). In some cases, the initiating UE 315-a may use the handshake to establish a sidelink ranging session after a capability exchange. The UEs 315 may exchange postPRS and determine an RTT from local measurements and the measurements received in postPRS. In some cases, the initiating UE 315-a may broadcast PRSrequest which may list target UEs 315. Each UE 315 may broadcast N-1 measurement results in postPRS, enabling an RTT calculation by each UE 315 to all the UEs 315.

Each UE 315 may report both a measured RTT and its location, if known, to all other participating UEs 315. In some cases, a UE 315 may have limited or inaccurate knowledge of its position which may yield an inter-UE range. For example, if the initiating UE 315-a has limited or inaccurate knowledge of its position, it may use the measurements acquired form the other UEs 315 during the sidelink-based ranging session to determine a relative distance of the initiating UE 315-a from the other UEs 315 that participated in the sidelink-based ranging session. In some cases, a UE 315 may have accurate knowledge of its position which may yield an absolute position. For example, if the initiating UE 315-a has accurate knowledge of its position, the initiating UE 315-a may use the measurements acquired form the other UEs 315 during the sidelink-based ranging session to determine an absolute position. In some cases, the initiating UE 315-a may broadcast a general PRSrequest to the other UEs 315 or may explicitly send some target UEs 315 a PRSrequest.

Thus, as described with reference to FIGS. 2 and 3, sidelink ranging may enable determination of the UE relative distance and absolute position. A sidelink ranging session may be triggered by a UE 315 broadcasting a request to other UEs 315 in it is vicinity. The initiating UE 315 (e.g., the UE 315-a) may specifically indicate which target UEs 315 it wishes to participate in the session. However, if the initiating UE 315 does not know what other UEs are in its vicinity, or if the UEs 315 in the vicinity of the initiating UE 315-a are moving (e.g., such as vehicles), then the initiating UE 315-a may broadcast a general request to solicit participants. This approach may result in not requiring a-priori knowledge of the target UEs 315, but may also result in the initiating UE receiving a large number of responses including responses from the UEs 315 too distant to benefit the initiator's sidelink ranging session.

Techniques described herein include multiple mechanisms for an initiating UE 315-a to initiate a sidelink ranging session to specify a distance of interest (e.g., a radius about the initiating UE 315-a) for which it wishes to engage in ranging with other UEs 315. Mechanisms described herein may reduce over-the-air (OTA) messaging, thereby reducing congestion, and UE power consumption. Techniques described herein may be utilized independently or jointly.

By operating in accordance with the techniques disclosed herein, the initiating UE 315-a may use a sidelink connection to initiate distance-limited sidelink-based ranging with multiple target UEs 315. In some examples, the initiating UE 315-a may initiate a sidelink ranging session by transmitting request messages to the target UEs 315, and may specify a distance of interest (e.g., a threshold distance, a radius round the initiating UE 315-a) for which the initiating UE 315-a may engage in ranging with target UEs 315. In some examples, the target UEs 315 located within the threshold distance may participate in the sidelink ranging session, while the target UEs 315 outside of the threshold distance may refrain from participating in the sidelink ranging session.

In some cases, as described in greater detail with reference to FIG. 5, the initiating UE 315-a may enforce the threshold distance by excluding any responses (e.g., PRSs) from UEs 315 beyond the threshold distance. The initiating UE 315-a may transmit confirmation messages to the target UEs 315 located within the threshold distance, but may refrain from transmitting confirmation messages to the target UEs 315 outside of the threshold distance. For example, the App layer at the initiating UE 315-a may specify the threshold distance, and the PHY layer and the MAC layer at the initiating UE may determine if a location for a target UE indicated in a received response exceeds the specified threshold distance.

In some cases, as described in greater detail with reference to FIG. 6, the target UEs 315 may enforce the threshold distance by responding to a request for a sidelink ranging session from the initiating UE 315-a if the target UEs 315 are located within the threshold distance. If the target UEs 315 are outside of the threshold distance, they may refrain from responding to the request. In some cases, the initiating UE 315-a and the target UEs 315 may enforce the threshold distance independently or jointly. The enforcement of the threshold distance is described in more detail with reference to FIG. 4.

Figure 4:
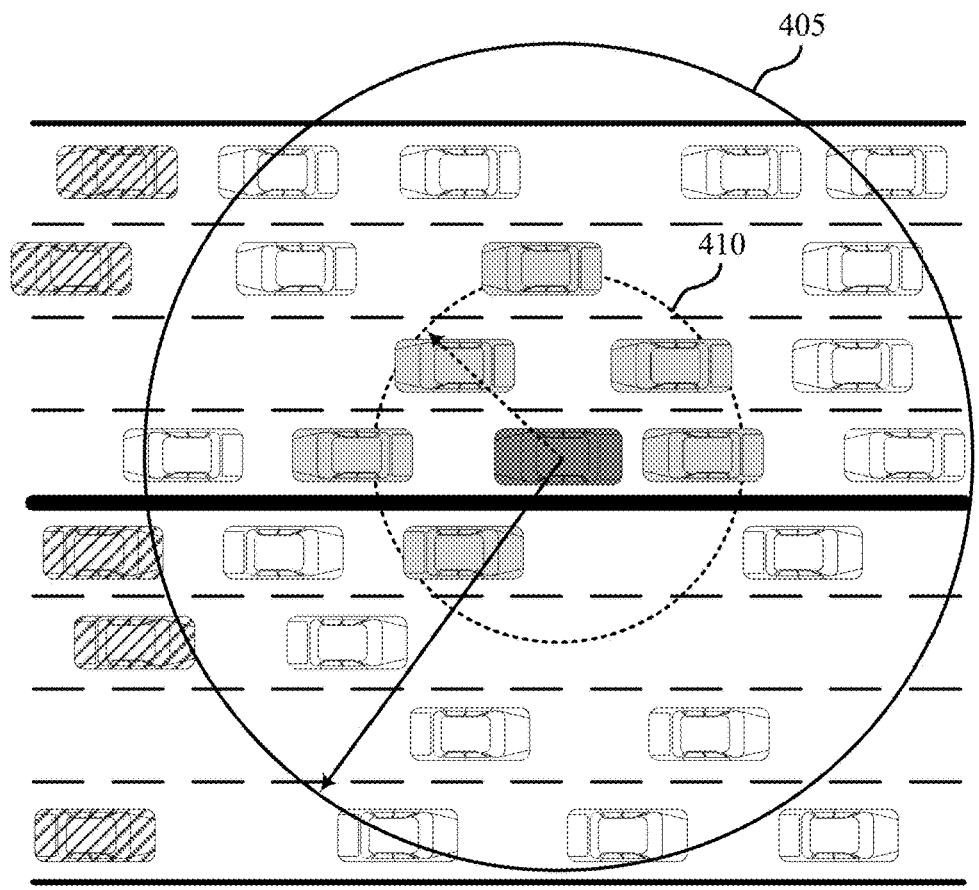
Figure 4:
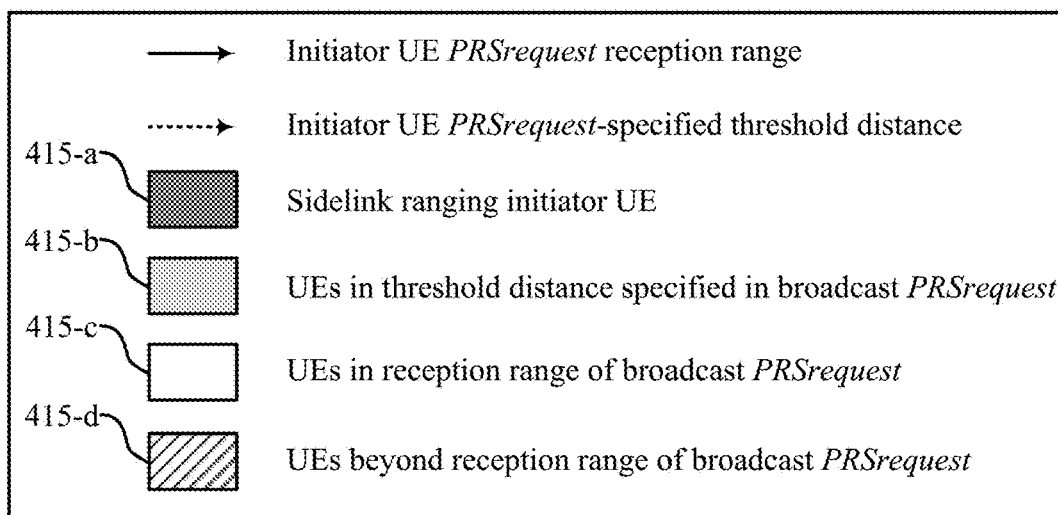

FIG. 4 illustrates an example of a wireless communications system 400 that supports distance-limited sidelink-based positioning in accordance with aspects of the present disclosure. In some examples, the wireless communications system 400 may implement, or be implemented by, aspects of wireless communications systems 100 and 300. The wireless communications system 400 includes one or more UEs 415, which may be examples of UEs 115, UEs 215, and UEs 315 as depicted in the examples of FIGS. 1-3.

As shown in FIG. 4, a group of UEs 415 may communicate with each other (e.g., within a V2X system, a D2D system, an industrial system, a home or building security system, a personal or home network, or the like), and may support distance-limited sidelink-based ranging in sidelink communications systems. In some examples, a UE 415 (e.g., an initiating UE 415-a) may use a sidelink connection to initiate distance-limited sidelink-based ranging with multiple target UEs 415 (e.g., UEs 415-b, UEs 415-c, UEs 415-d). For example, the initiating UE 415-a may initiate a sidelink ranging session by broadcasting PRSrequest messages to the target UEs 415, and may constrain the sidelink ranging session to a specified threshold distance. In some cases, the initiating UE 415-a may indicate the threshold distance in the PRSrequest (e.g., at the App layer or PC5-signaling (PC5-S) layer). For example, the initiating UE 415-a may impose a threshold distance constraint, which may be a radius surrounding the initiating UE 415-a. In some examples, as described in greater detail with reference to FIG. 5, all the target UEs 415 may respond to PRSrequest messages, but the initiating UE 415-a may ignore responses from the target UEs 415 located outside of the threshold distance. In some examples, as described in greater detail with reference to FIG. 6, the target UEs located within the threshold distance may participate in the sidelink ranging session, while the target UEs outside of the threshold distance may refrain from participating in the sidelink ranging session.

In some cases, the initiating UE 415-*a* may impose a threshold distance constraint, which may be a radius surrounding the initiating UE 415-*a*. The initiating UE 415-*a* may use control message parameters to determine an inter-UE distance, including a zone identifier (ID) and a distance. The zone ID may present the location of a UE 415 based on an a-priori defined zone, and the distance may be defined as a separation in a number of zones or as an absolute distance measurement between UEs 415. In some cases, the zone ID and the distance parameters may be used at the PHY layer, the MAC layer, or both to control retransmission and allow for high reliability. In some examples, the network (e.g., a base station) may indicate the dimensions of each zone to the UEs 415, such that the zones may be defined in some geographic region and the UEs 415 may be aware of the zones such that the UEs 415 may determine their proximity in terms of zones to each other. In some cases, the initiating UE 415-*a* may use different distance parameters such as sl-ZoneConfig, sl-ZoneLength, and sl-TransRange, among others. For example, the initiating UE 415-*a* may use sl-ZoneConfig to configure the zone dimension by specifying sl-ZoneLength. In some cases, the initiating UE 415-*a* may use sl-ZoneLength to specify the zone dimensions (e.g., length=width) in meters selected from a number of values (e.g., 5 m, 10 m, 20 m, 30 m, 40 m, 50 m). In some cases, the initiating UE 415-*a* may use sl-TransRange to specify the desired transmission range in meters selected from a number of values (e.g., 20 m, 50 m, 80 m, 100 m, 120 m, 150 m, 180 m, 200 m, 220 m, 250 m, 270 m, 300 m, 350 m, 370 m, 400 m, 420 m, 450 m, 480 m, 500 m, 550 m, 600 m, 700 m, 1000 m).

In some examples, the threshold distance may be defined in terms of a radius (e.g., an absolute distance) from the initiating UE 415-*a*. For example, the threshold distance may be defined as a distance from an initiating UE 415-*a* global positioning system (GPS) location (e.g., defined by GPS coordinates). In some examples, the threshold distance may be defined in terms of a radius or absolute distance from a physical address. For instance, if the initiating UE 415-*a* is a security device, a home device, a smart phone or security panel, or the like (e.g., located at a home, a building, or the like), the threshold distance may be defined as a distance or radius from the physical location (e.g., physical address on a map) of the home, building, or the like associated with the initiating UE 415-*a*.

In some examples, the initiating UE 415-*a* may support a PRSrequest reception range 405. The PRSrequest reception range 405 may include the initiating UE 415-*a*, one or more UEs 415-*b*, and one or more UEs 415-*c*. In some cases, the wireless communications system 400 may also include UEs 415-*d*, which may be beyond (e.g., outside of) the reception range of the PRSrequest. In some cases, the initiating UE 415-*a* may support a threshold distance 410, which may include the initiating UE 415-*a* and the UEs 415-*b*. In some examples, the PRSrequest reception range 405 may be larger (e.g., cover more physical space) than a threshold distance 410 (e.g., which may define an area of interest for the initiating UE 415-*a*). If UE-initiated sidelink ranging is performed without a distance constraint enforced, then all the UEs 415 located within the PRSrequest reception range 405 may participate in the ranging session, which may result in unnecessary information and computations at the initiating UE 415-*a*. However, as described herein, if the UEs 415 perform sidelink ranging with distance constraints enforced, then the UEs 415-*b* located within threshold distance 410 may participate in the sidelink ranging session. This may result in reduced OTA signaling, reduced UE power consumption, and the like.

The initiating UE 415-*a* may broadcast a PRSrequest to a number of UEs 415, and may enforce the threshold distance 410 by excluding any PRSresponse from the UEs 415 beyond the threshold distance 410. In some cases, the App layer at the initiating UE 415-*a* may specify the threshold distance 410, and the PHY-MAC layer at the initiating UE 415-*a* may determine whether a received PRSresponse exceeds the threshold distance 410. In such examples, the UEs 415 that respond to the PRSrequest (e.g., the UEs 415-*b* and the UEs 415-*c*) may include an indication of their location in the PRSresponse. The indication of the UE location included in a PRSresponse may be defined in terms of GPS coordinates, zone identifiers (e.g., a zone identifier for the location of the target UE 415), an indication of a number of zone identifiers between the initiating UE 415-*a* and the target UE 415, map coordinates defining a physical location on a map, or any combination thereof.

If the received PRSresponse indicates a location for the target UE 415 that is located within the threshold distance 410, then the initiating UE 415-*a* may pass the corresponding messages (e.g., PRSresponses) to the App layer. If the received PRSresponse indicates a location for the target UE 415 that exceeds the threshold distance 410, then the initiating UE 415-*a* may refrain from passing the corresponding messages to the App layer. As such, the initiating UE 415-*a* may map the threshold distance to the NR transmission distance of the PRSresponse. For example, the initiating UE 415-*a* may receive PRSresponse messages from the UEs 415-*b*, which may be inside of the threshold distance 410, and PRSresponse messages from the UEs 415-*c*, which may be outside of the threshold distance 410. The initiating UE 415-*a* may process or discard the received PRSresponse from UEs 415-*c* based on the threshold distance in the App layer or the PC5-S layer. But the initiating UE 415-*a* may pass a PRSresponse received from the UEs 415-*b* to the App layer for processing, resulting in exchange of PRSs and postPRS signaling with the UEs 415-*b*.

In some cases, a target UE 415 may enforce the threshold distance 410 by responding to a PRSrequest from the initiating UE 415-*a* if the target UE 415 is located within the threshold distance 410. The initiating UE 415-*a* may include an indication of the threshold distance 410 (e.g., the zone ID and the range indication, map coordinates, GPS coordinates, number of zone identifiers, or the like) in the PRSrequest. In some cases, the initiating UE 415-*a* may indicate for the RRC layer to expose the current zone ID of the receiving UE 415 to the App layer. In some cases, the initiating UE 415-*a* may include the GNSS position of the initiating UE 415-*a* and a range (e.g., a radius) in the App layer, where the range may be the threshold distance 410. Absent a GNSS position, the initiating UE 415-*a* may include a physical address (e.g., based on a map location) in the App layer.

Upon receiving the indication of the threshold distance 410, the UEs 415 may determine whether they are located within the threshold distance 410. For instance, the target UEs 415 may compare their own location with the indicated location of the initiating UE 415-*a*, and may determine whether their respective locations satisfy the threshold distance 410. The UEs 415-*b* may determine that they are located within threshold distance 410, and may transmit PRSresponses to the initiating UE 415-*a*. The UEs 415-*c* may determine that they are located outside of the threshold distance 410, and may refrain from transmitting PRSresponses to the initiating UE 415-*a*.

In some examples, (e.g., V2X deployments), an initiating UE 415-*a* may include mobility information (e.g., speed, velocity, tracking information, or the like) in the PRSrequest. In such examples, a target UE 415 may utilize the mobility information (e.g., in combination with its own mobility information) to determine whether a mobile initiating UE 415-*a* and a mobile UE 415-*b* or a mobile UE 415-*c* are currently located within threshold distance 410 of each other (e.g., which may change over time given the mobility of the UEs 415). In some cases, the techniques described herein may reduce over-the-air signaling and power consumption for a UE 415, among other benefits.

Figure 5:
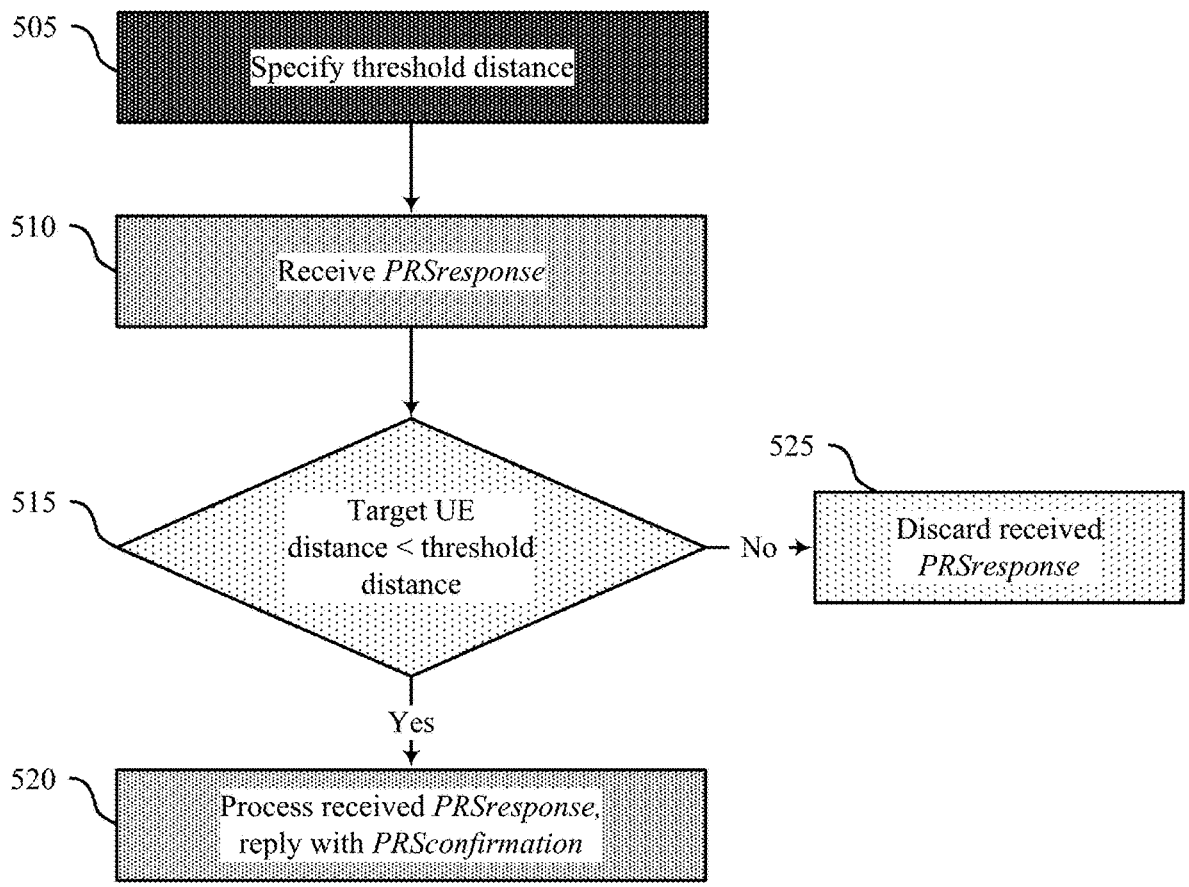
FIGS. 5 and 6 illustrate examples of flow diagrams in accordance with aspects of the present disclosure.
Figure 5:
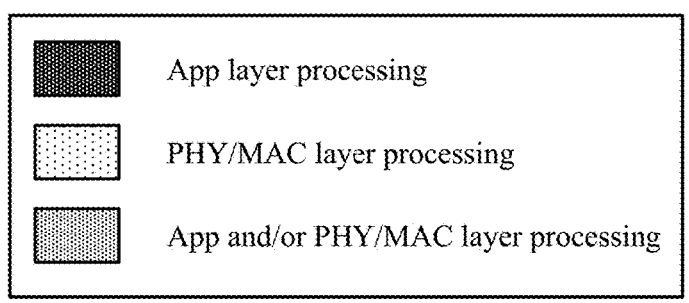

FIG. 5 illustrates an example of a flow diagram 500 that supports distance-limited sidelink-based positioning in accordance with aspects of the present disclosure. In some examples, the flow diagram 500 may implement, or be implemented by, aspects of the wireless communications systems 100, 300, and 400.

In some cases, an initiating UE (e.g., an initiating UE 415-*a* as described with reference to FIG. 4) may initiate a distance-limited sidelink-based ranging session with multiple target UEs by broadcasting a PRSrequest. The initiating UE may impose a threshold distance constraint (e.g., a radius surrounding the initiating UE) to ensure that the initiating UE receives PRSresponse from target UEs located within the threshold distance, and may enforce the threshold distance. For example, at 505, the initiating UE may specify a threshold distance at the App layer. The initiating UE may broadcast a PRSrequest to target UEs in the reception range of the initiating UE. In some examples, the PRSrequest may include an indication of the specified threshold distance. In some examples, the PRSrequest may not include an indication of the threshold distance, in which case all receiving target UEs located within the range of the initiating UE may respond, without regard to their relative locations. At 510, the initiating UE may receive PRSresponse (e.g., in response to the PRSrequest) from one or more of the target UEs in the reception range of the initiating UE. The initiating UE may receive PRSresponse at the PHY-MAC layer.

At 515, the initiating UE may determine a distance between a target UE (e.g., which sent a PRSresponse) and the initiating UE, and may determine whether the determined distance satisfies the threshold distance specified at 505. The initiating UE may make the comparison at the PHY-MAC layer. For example, the initiating UE may compare whether the target UE location or distance indicated in the PRSresponse is less than the threshold distance. At 520, if the target UE distance is less than the threshold distance, the initiating UE may process the received PRSresponse sent from the target UE (e.g., may pass the PRSresponse to the App layer) and reply to the target UE with a PRSconfirmation. At 525, if the target UE distance is greater than the threshold distance, the initiating UE may discard the received a PRSresponse in the PHY-MAC layers so the target UE refrains from participating in the sidelink ranging session. As such, the initiating UE may enforce the threshold distance by processing responses to the broadcasted PRSrequest from target UEs located within the threshold distance and by discarding responses from target UEs outside of the threshold distance.

Figure 6:
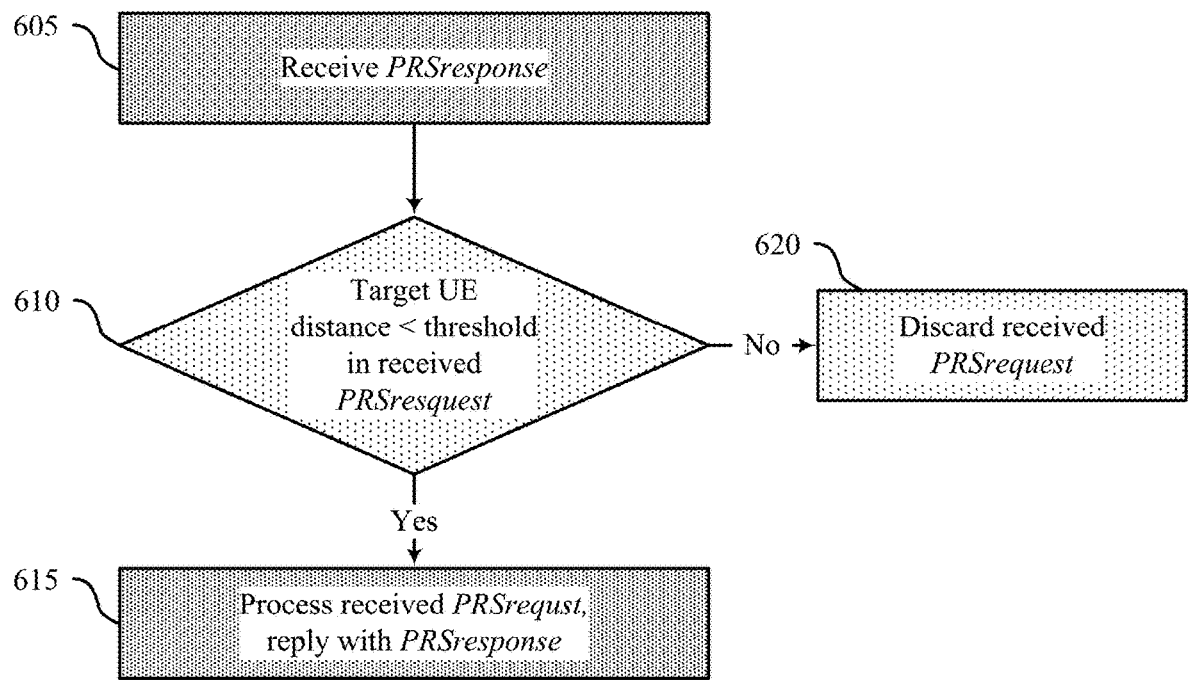
Figure 6:
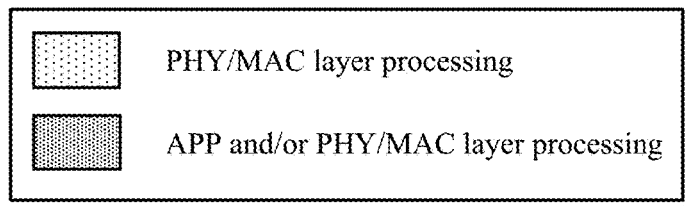

FIG. 6 illustrates an example of a flow diagram 600 that supports distance-limited sidelink-based positioning in accordance with aspects of the present disclosure. In some examples, the flow diagram 600 may implement, or be implemented by, aspects of wireless communications systems 100, 300, and 400.

In some cases, an initiating UE (e.g., an initiating UE 415-*a* as described with reference to FIG. 4) may initiate a distance-limited sidelink-based ranging session with multiple target UEs by broadcasting a PRSrequest. The initiating UE may impose a threshold distance constraint (e.g., a radius surrounding the initiating UE) to ensure that the initiating UE receives PRSresponse from target UEs located within the threshold distance, and the target UEs may enforce the threshold distance. At 605, a target UE in the reception range of the initiating UE may receive a PRSrequest. The PRSrequest may include an indication of a threshold distance specified by the initiating UE.

At 610, the target UE may compare a distance from the target UE to the initiating UE, to the specified threshold distance in the received PRSrequest. The target UE may make the comparison at the PHY-MAC layer. For example, the target UE may determine whether the target UE distance from the initiating UE is less than the threshold distance indicated in the received PRSrequest. At 615, if the target UE distance is less than the threshold distance, the target UE may receive the PRSrequest from the initiating UE and reply to the initiating UE with a PRSresponse. At 620, if the target UE distance is greater than the threshold distance, the target UE may discard the received PRSrequest, and may refrain from transmitting a PRSresponse to the initiating UE. As such, the target UE may enforce the threshold distance by participating in the initiating UE's sidelink ranging session if the target UE is located within the threshold distance, or by refraining from participating if the target UE is outside of the threshold distance.

Figure 7:
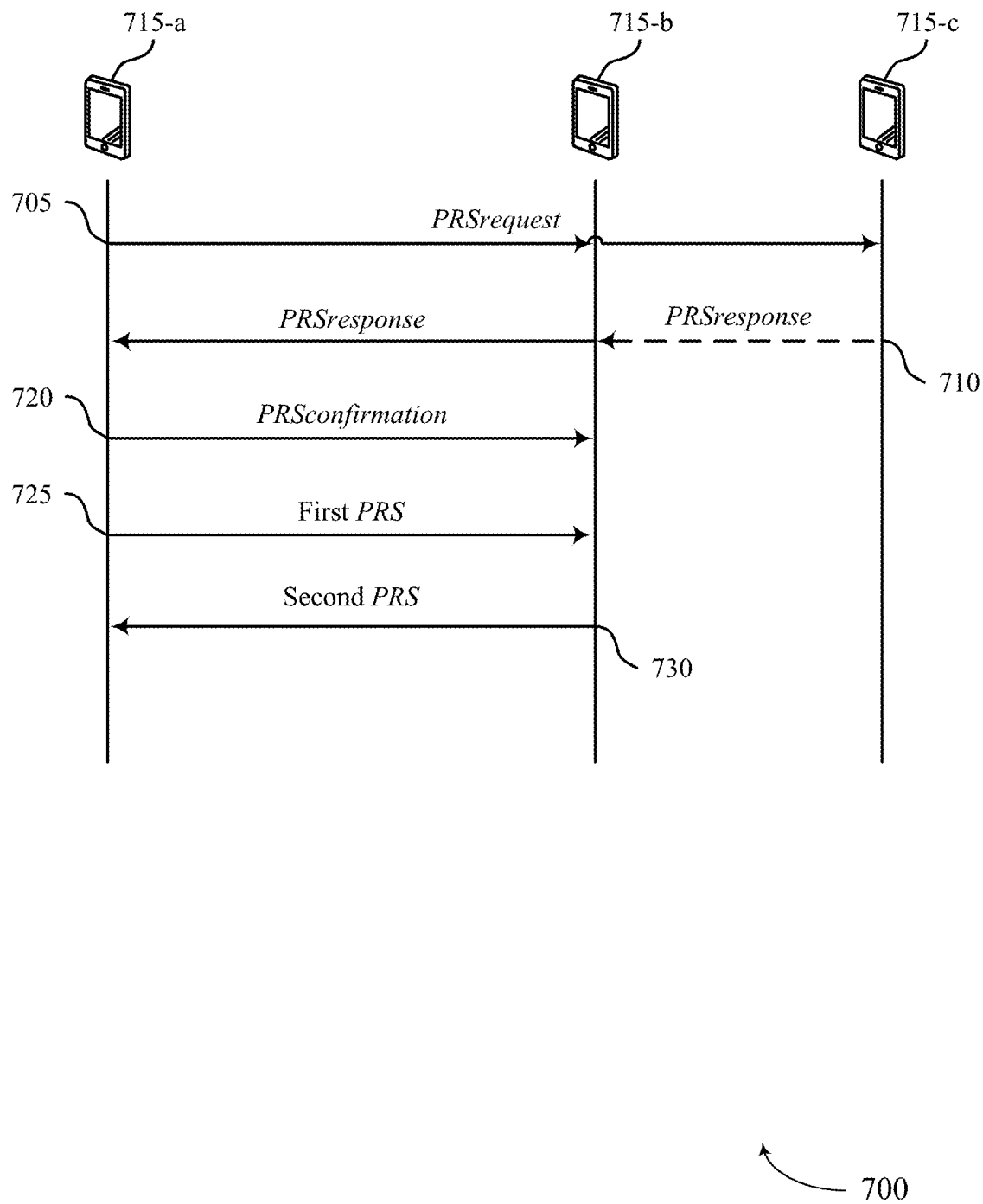
FIG. 7 illustrates an example of a process flow in accordance with aspects of the present disclosure.

FIG. 7 illustrates an example of a process flow 700 that supports distance-limited sidelink-based positioning in accordance with aspects of the present disclosure. The process flow 700 may implement aspects of wireless communications systems 100, 300, and 400, or may be implemented by aspects of the wireless communications system 100, 300, and 400. For example, the process flow 700 may illustrate operations between a UE 715-*a*, a UE 715-*b*, and a UE 715-*c* which may be examples and a UE 115, a UE 315, and a UE 415 as described with reference to FIGS. 1, 3, and 4. In the following description of the process flow 700, the operations between the UE 715-*a*, the UE 715-*b*, and the UE 715-*c* may be transmitted in a different order than the example order shown, or the operations performed by the UE 715-*a*, the UE 715-*b*, and the UE 715-*c* may be performed in different orders or at different times. Some operations may also be omitted from the process flow 700, and other operations may be added to the process flow 700.

At 705, the UE 715-*a* (e.g., an initiating UE) may initiate a distance-limited sidelink-based ranging session with the UE 715-*b* and the UE 715-*c* (e.g., multiple target UEs) by transmitting, to one or more target UEs (e.g., the UE 715-*b* and the UE 715-*c*), one or more request messages (e.g., PRSrequest) via a sidelink channel. In some cases, the one or more request messages may include an indication of the threshold distance from the UE 715-*a*. In some cases, the UE 715-*a* may transmit a broadcast sidelink message including the one or more request messages to the one or more target UEs, or the UE 715-*a* may transmit one or more unicast sidelink messages including one or more request messages to each respective target UE.

At 710, the UE 715-*a* may receive, from at least a first subset of the one or more target UEs (e.g., the UE 715-*b*, the UE 715-*c*, or both) located within a threshold distance from the UE 715-*a*, one or more response messages (e.g., PRSresponse) via the sidelink channel.

In some cases, the UE 715-*a* may enforce a threshold distance for the sidelink ranging session, as described in greater detail with reference to FIG. 5. For instance, the threshold distance may include a zone ID for a geographic area, an indication of one or more zones within the threshold distance, a spatial distance, or a combination thereof. Additionally or alternatively, the threshold distance may include a GPS coordinate, one or more mobility parameters for the UE 715-*a*, a radius value, a physical address based on a map location, one or more map coordinates, or a combination thereof. UE 715-*a* may receive the one or more response messages at 710, each including location information for a respective target UE 715 of the one or more target UEs. In some cases, the location information may indicate a zone ID for the respective target UE, a GPS coordinate for the respective target UE, one or more mobility parameters for the respective target UE, or any combination thereof. In some cases, the UE 715-*a* may receive, from the first subset of the one or more target UEs, the one or more response messages based on each target UE in the first subset being located within the threshold distance from the UE 715-*a*.

For example, at 710, the UE 715-*a* may receive a set of response messages from a first subset of UEs 715 located within the threshold distance. the set of response messages may include a first response message (e.g., PRSresponse) from the UE 715-*b*. At 710, the UE 715-*a* may receive one or more additional response messages from a second subset of UEs 715 that are located outside of the threshold distance. The additional response messages may include a second response message (e.g., PRSresponse) from the UE 715-*c*. The UE 715-*b* may be located within the threshold distance from the UE 715-*a*, and the UE 715-*b* may be located outside of the threshold distance from the UE 715-*a*. Both the first and the second response message may include location information for the respective UEs 715. UE 715-*a* may receive the response messages (e.g., at the PHY-MAC layer), and may determine whether the locations for the respective UEs 715 satisfy the threshold distance. Upon determining that the UE 715-*b* is located within the threshold distance, the UE 715-*a* may process the first response message (e.g., may pass the response message to the App layer of UE 715-*a*), and may proceed with the sidelink ranging session (e.g., by transmitting a PRSconfirmation to the UE 715-*b* at 720).

In some examples, the target UEs 715 may enforce the threshold distance, as described in greater detail with reference to FIG. 6. For example, at 710, the UE 715-*a* may receive a response message (e.g., PRSresponse) from the UE 715-*b* based on the UE 715-*b* being located within the threshold distance, and may not receive a response from the UE 715-*c* based on the UE 715-*c* being located outside of the threshold distance. Target UEs (e.g., the UE 715-*b* and the UE 715-*c*) may enforce the threshold distance by responding to the request message from the UE 715-*a* if the target UEs 715 are located inside of the threshold distance. For example, the UE 715-*a* may include, in the request message, and indication of the threshold distance. The indication of the threshold distance may include a zone ID for a geographic area, an indication of one or more zones within the threshold distance, a spatial distance, or a combination thereof. Additionally or alternatively, the indication of the threshold distance may include a GPS coordinate, one or more mobility parameters for the UE 715-*a*, a radius value, a physical address based on a map location, one or more map coordinates, or a combination thereof. The UE 715-*a* and the UE 715-*b* may determine, upon receiving the request message at 705, whether they are located within the threshold distance. Because the UE 715-*b* is located within the threshold distance, the UE 715-*b* may transmit the response message to the UE 715-*a* at 710. However, because the UE 715-*c* is located outside of the threshold distance, UE 715-*c* may refrain from transmitting the response message at to the UE 715-*a* at 710.

At 720, the UE 715-*a* may transmit, to the first subset of UEs 715 (e.g., the UE 715-*b*) based on receiving the one or more response messages (e.g., PRSresponse), one or more confirmation messages (e.g., PRSconfirmation). In some cases, transmitting the conformation messages may be based on the UE 715-*a* receiving the one or more response messages from the target UEs. For example, as illustrated with reference to FIG. 5, the UE 715-*a* (e.g., an initiating UE) may enforce the threshold distance by transmitting confirmation messages to target UEs located within the threshold distance, and by refraining from transmitting confirmation messages to target UEs located outside of the threshold distance. As such, the UE 715-*a* may transmit a confirmation message to the UE 715-*b*, but refrain from transmitting a confirmation message to the UE 715-*c*. In some examples, as illustrated with reference to FIG. 6, the UE 715-*a* may transmit a confirmation message to the subset of UEs 715 (e.g., the UE 715-*b*) from which the UE 715-*a* received a response message at 710. For instance, because the UE 715-*b* transmitted the response message at 710 (e.g., and because the UE 715-*c* did not transmit the response message at 710), the UE 715-*a* may transmit the confirmation message at 720 to the UE 715-*b*.

At 725, the UE 715-*a* may transmit, via the sidelink channel, one or more first PRSs (e.g., first PRS) to each target UE in the first subset of UEs 715 (e.g., the UE 715-*b*) based on receiving the one or more response messages from the first subset of UEs 715. In some cases, the UE 715-*a* may transmit a PRS to a respective target UE 715 in the first subset that are each determined to be located within the threshold distance based on the location information indicated in the one or more response messages. That is, the UE 715-*a* may transmit a PRS to a respective UE 715-*b* (e.g., a target UE) in the first subset of the one or more UEs 715 that are each located within the threshold distance from the UE 715-*a*.

At 730, the UE 715-*a* may receive one or more second PRSs (e.g., second PRS) from each target UE in the first subset in response to transmitting the one or more first PRSs. For example, the UE 715-*a* may receive a second PRS from the UE 715-*b* based on the UE 715-*a* transmitting the first PRS to the UE 715-*b* at 725. As such, the exchange of PRSs between the UE 715-*a* and the UE 715-*b* may be used to a determine relative and an absolute positioning of the UEs 715.

Subsequent to exchanging the first and second PRSs, the UE 715-*a* and the UE 715-*b* (e.g., and any additional target UEs 715 located within the threshold distance) may complete a ranging session, and may exchange postPRS signaling including measurement information determined based on exchanging first and second PRSs at 725 and 730.

Figure 8:
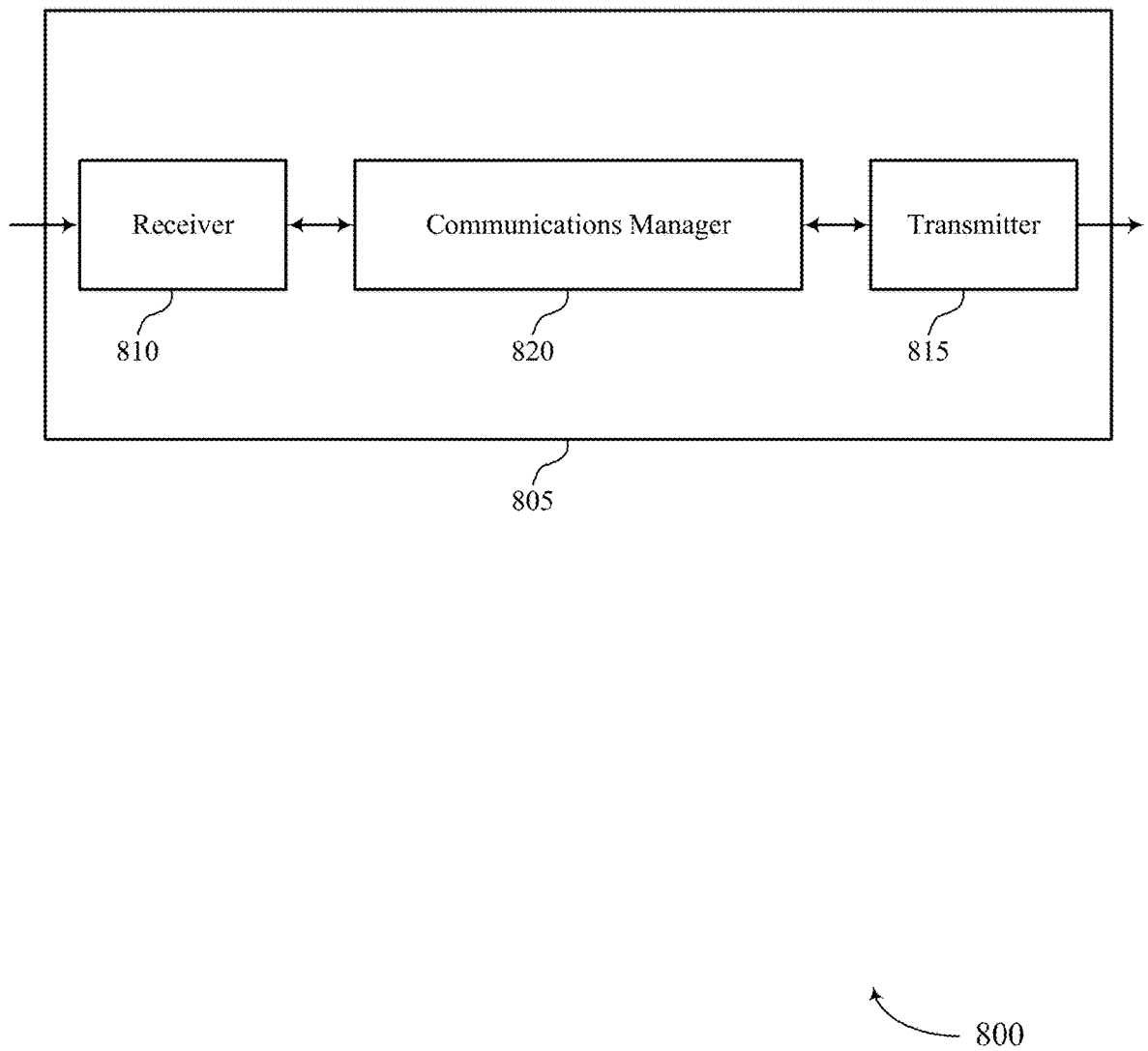
FIGS. 8 and 9 show block diagrams of devices in accordance with aspects of the present disclosure.

FIG. 8 shows a block diagram 800 of a device 805 that supports distance-limited sidelink-based positioning in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to distance-limited sidelink-based positioning). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to distance-limited sidelink-based positioning). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of distance-limited sidelink-based positioning as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at an initiating UE in accordance with examples as disclosed herein. For example, the communications manager 820 may be configured as or otherwise support a means for transmitting, to a set of multiple target UEs, one or more PRS request messages via a sidelink channel. The communications manager 820 may be configured as or otherwise support a means for receiving, from at least a first subset of the set of multiple target UEs located within a threshold distance from the initiating UE, one or more PRS response messages via the sidelink channel. The communications manager 820 may be configured as or otherwise support a means for transmitting, via the sidelink channel, one or more first PRSs to each target UE in the first subset based on receiving the one or more PRS response messages from the first subset.

Additionally or alternatively, the communications manager 820 may support wireless communications at a target UE in accordance with examples as disclosed herein. For example, the communications manager 820 may be configured as or otherwise support a means for receiving, from an initiating UE via a sidelink channel, a PRS request message including an indication of a threshold distance from the initiating UE. The communications manager 820 may be configured as or otherwise support a means for transmitting, to the initiating UE via the sidelink channel based on the target UE being located within the threshold distance from the initiating UE, a PRS response message. The communications manager 820 may be configured as or otherwise support a means for receiving, via the sidelink channel, one or more first PRSs based on transmitting the PRS response message.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for distance-limited sidelink-based positioning which may increase power savings and extend battery life of the device 805, while ensuring reliable and efficient communications. The techniques described herein may support high reliability and low latency communications, among other benefits.

Figure 9:
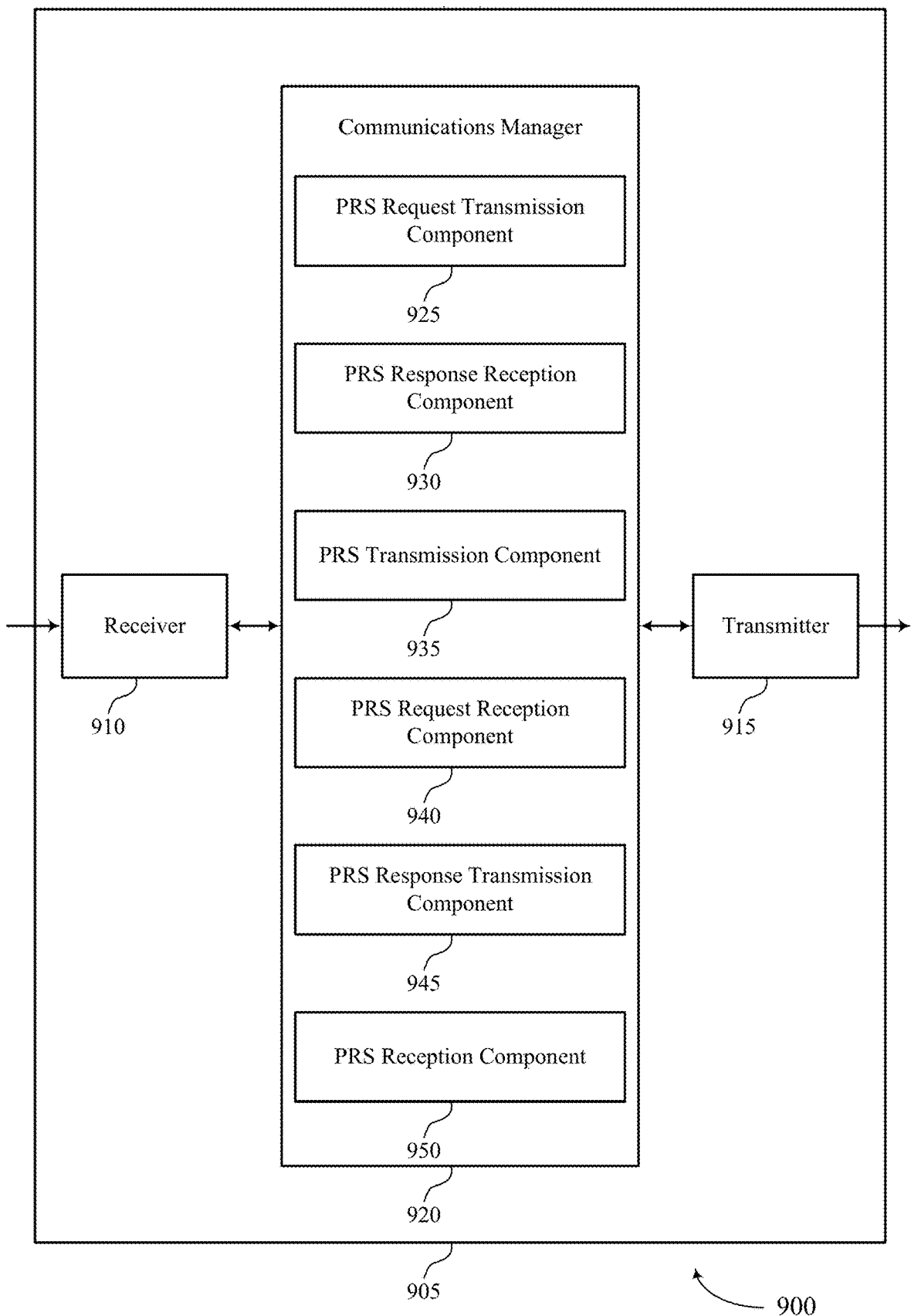

FIG. 9 shows a block diagram 900 of a device 905 that supports distance-limited sidelink-based positioning in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to distance-limited sidelink-based positioning). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to distance-limited sidelink-based positioning). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of distance-limited sidelink-based positioning as described herein. For example, the communications manager 920 may include an PRS request transmission component 925, an PRS response reception component 930, an PRS transmission component 935, an PRS request reception component 940, an PRS response transmission component 945, an PRS reception component 950, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at an initiating UE in accordance with examples as disclosed herein. The PRS request transmission component 925 may be configured as or otherwise support a means for transmitting, to a set of multiple target UEs, one or more PRS request messages via a sidelink channel. The PRS response reception component 930 may be configured as or otherwise support a means for receiving, from at least a first subset of the set of multiple target UEs located within a threshold distance from the initiating UE, one or more PRS response messages via the sidelink channel. The PRS transmission component 935 may be configured as or otherwise support a means for transmitting, via the sidelink channel, one or more first PRSs to each target UE in the first subset based on receiving the one or more PRS response messages from the first subset.

Additionally or alternatively, the communications manager 920 may support wireless communications at a target UE in accordance with examples as disclosed herein. The PRS request reception component 940 may be configured as or otherwise support a means for receiving, from an initiating UE via a sidelink channel, a PRS request message including an indication of a threshold distance from the initiating UE. The PRS response transmission component 945 may be configured as or otherwise support a means for transmitting, to the initiating UE via the sidelink channel based on the target UE being located within the threshold distance from the initiating UE, a PRS response message. The PRS reception component 950 may be configured as or otherwise support a means for receiving, via the sidelink channel, one or more first PRSs based on transmitting the PRS response message.

Figure 10:
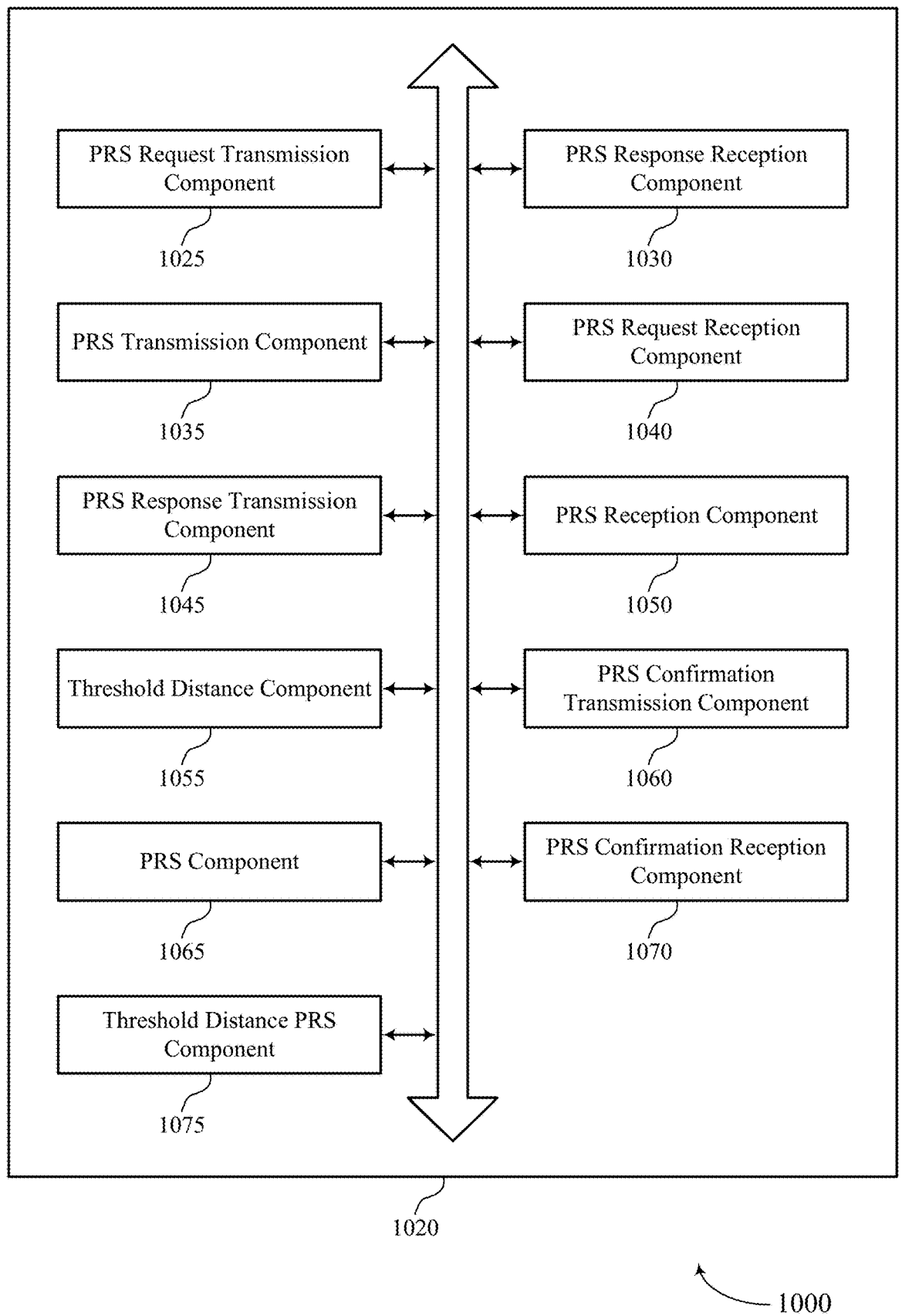
FIG. 10 shows a block diagram of a communications manager in accordance with aspects of the present disclosure.

FIG. 10 shows a block diagram 1000 of a communications manager 1020 that supports distance-limited sidelink-based positioning in accordance with aspects of the present disclosure. The communications manager 1020 may be an example of aspects of a communications manager 820, a communications manager 920, or both, as described herein. The communications manager 1020, or various components thereof, may be an example of means for performing various aspects of distance-limited sidelink-based positioning as described herein. For example, the communications manager 1020 may include an PRS request transmission component 1025, an PRS response reception component 1030, an PRS transmission component 1035, an PRS request reception component 1040, an PRS response transmission component 1045, an PRS reception component 1050, a threshold distance component 1055, an PRS confirmation transmission component 1060, an PRS component 1065, an PRS confirmation reception component 1070, a threshold distance PRS component 1075, or any combination thereof. Each of these components may communicate, directly or indirectly, with one another (e.g., via one or more buses).

The communications manager 1020 may support wireless communications at an initiating UE in accordance with examples as disclosed herein. The PRS request transmission component 1025 may be configured as or otherwise support a means for transmitting, to a set of multiple target UEs, one or more PRS request messages via a sidelink channel. The PRS response reception component 1030 may be configured as or otherwise support a means for receiving, from at least a first subset of the set of multiple target UEs located within a threshold distance from the initiating UE, one or more PRS response messages via the sidelink channel. The PRS transmission component 1035 may be configured as or otherwise support a means for transmitting, via the sidelink channel, one or more first PRSs to each target UE in the first subset based on receiving the one or more PRS response messages from the first subset.

In some examples, to support receiving the one or more PRS response messages, the PRS response reception component 1030 may be configured as or otherwise support a means for receiving the one or more PRS response messages each including location information for a respective target UE of the set of multiple target UEs.

In some examples, to support transmitting the one or more first PRSs to the first subset of the set of multiple target UEs, the PRS transmission component 1035 may be configured as or otherwise support a means for transmitting a PRS to a respective target UE in the first subset that are each determined to be located within the threshold distance based on the location information indicated in the one or more PRS response messages.

In some examples, to support receiving the one or more PRS response messages, the PRS response reception component 1030 may be configured as or otherwise support a means for receiving the one or more PRS response messages including the location information that indicates a zone identifier for a respective target UE.

In some examples, to support receiving the one or more PRS response messages, the PRS response reception component 1030 may be configured as or otherwise support a means for receiving the one or more PRS response messages including the location information that indicates a global positioning system coordinate for a respective target UE, one or more mobility parameters for the respective target UE, or any combination thereof.

In some examples, to support transmitting the one or more PRS request messages, the threshold distance component 1055 may be configured as or otherwise support a means for transmitting one or more PRS request messages including an indication of the threshold distance from the initiating UE.

In some examples, to support receiving the one or more PRS response messages, the threshold distance component 1055 may be configured as or otherwise support a means for receiving, from the first subset of the set of multiple target UEs, the one or more PRS response messages based on each target UE in the first subset being located within the threshold distance from the initiating UE.

In some examples, to support indication of the threshold distance, the threshold distance component 1055 may be configured as or otherwise support a means for a zone identifier for a geographical area, an indication of one or more zones within the threshold distance, a spatial distance, or any combination thereof.

In some examples, to support indication of the threshold distance, the threshold distance component 1055 may be configured as or otherwise support a means for a global positioning system coordinate, one or more mobility parameters for the initiating UE, a radius value, a physical address based on a map location, one or more map coordinates, or any combination thereof.

In some examples, to support receiving the one or more PRS response messages, the PRS response reception component 1030 may be configured as or otherwise support a means for receiving the one or more PRS response messages from the first subset of the set of multiple target UEs that are each located within the threshold distance from the initiating UE and a second subset of the set of multiple target UEs that are each located outside of the threshold distance from the initiating UE.

In some examples, to support transmitting the one or more first PRSs to the first subset of the set of multiple target UEs, the PRS transmission component 1035 may be configured as or otherwise support a means for transmitting a PRS to a respective UE in the first subset of the set of multiple target UEs that are each located within the threshold distance from the initiating UE.

In some examples, to support transmitting the one or more PRS request messages, the PRS transmission component 1035 may be configured as or otherwise support a means for transmitting a broadcast sidelink message including the one or more PRS request messages to the set of multiple target UEs.

In some examples, the PRS confirmation transmission component 1060 may be configured as or otherwise support a means for transmitting, to the first subset based on receiving the one or more PRS response messages, one or more PRS confirmation messages, where transmitting the one or more first PRSs is based on transmitting the one or more PRS confirmation messages.

In some examples, to support transmitting the one or more PRS request messages, the PRS transmission component 1035 may be configured as or otherwise support a means for transmitting a set of multiple unicast sidelink messages including the one or more PRS request messages to respective target UEs of the set of multiple target UEs.

In some examples, the PRS component 1065 may be configured as or otherwise support a means for receiving one or more second PRSs from each target UE in the first subset in response to transmitting the one or more first PRSs.

Additionally or alternatively, the communications manager 1020 may support wireless communications at a target UE in accordance with examples as disclosed herein. The PRS request reception component 1040 may be configured as or otherwise support a means for receiving, from an initiating UE via a sidelink channel, a PRS request message including an indication of a threshold distance from the initiating UE. The PRS response transmission component 1045 may be configured as or otherwise support a means for transmitting, to the initiating UE via the sidelink channel based on the target UE being located within the threshold distance from the initiating UE, a PRS response message. The PRS reception component 1050 may be configured as or otherwise support a means for receiving, via the sidelink channel, one or more first PRSs based on transmitting the PRS response message.

In some examples, the PRS component 1065 may be configured as or otherwise support a means for transmitting one or more second PRSs to the initiating UE in response to receiving the one or more first PRSs.

In some examples, the PRS confirmation reception component 1070 may be configured as or otherwise support a means for receiving, from the initiating UE based on transmitting the PRS response message, a PRS confirmation message, where receiving the one or more first PRSs is based on receiving the PRS confirmation message.

In some examples, to support receiving the PRS request message including the indication of the threshold distance from the initiating UE, the threshold distance PRS component 1075 may be configured as or otherwise support a means for receiving an indication of a zone identifier for a geographical area in which the initiating UE is located, an indication of one or more zones, a spatial distance, or any combination thereof.

In some examples, to support receiving the PRS request message including the indication of the threshold distance from the initiating UE, the threshold distance PRS component 1075 may be configured as or otherwise support a means for a global positioning system coordinate for the initiating UE, one or more mobility parameters for the initiating UE, a radius value, a physical address based on a map location, one or more map coordinates, or any combination thereof.

In some examples, the PRS request reception component 1040 may be configured as or otherwise support a means for receiving, from a second initiating UE via a sidelink channel, a PRS request message including an indication of a threshold distance from the second initiating UE. In some examples, the PRS response transmission component 1045 may be configured as or otherwise support a means for refraining from transmitting a PRS response message based on the target UE not being located within the threshold distance from the second initiating UE.

Figure 11:
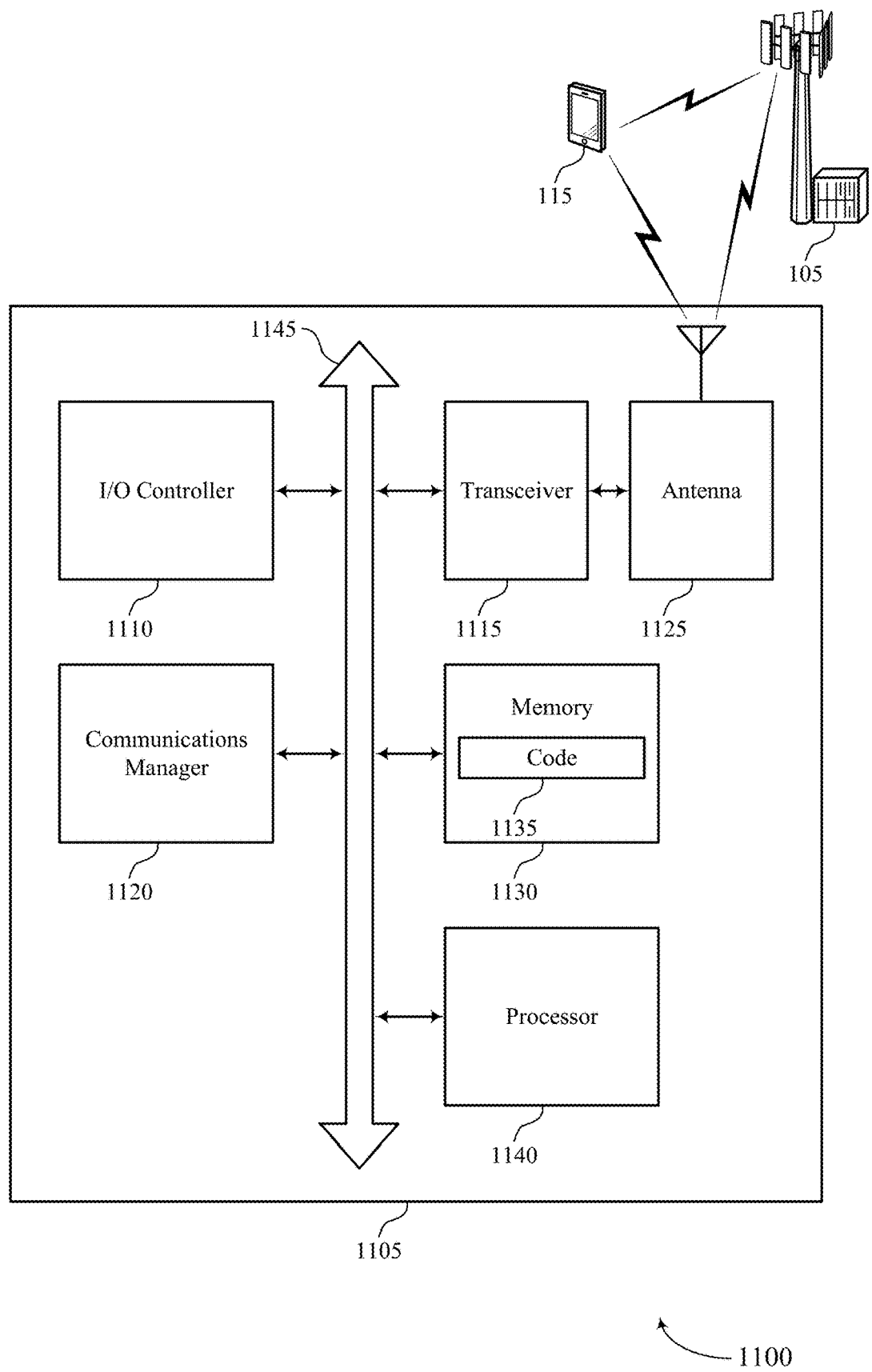
FIG. 11 shows a diagram of a system including a device in accordance with aspects of the present disclosure.

FIG. 11 shows a diagram of a system 1100 including a device 1105 that supports distance-limited sidelink-based positioning in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting distance-limited sidelink-based positioning). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at an initiating UE in accordance with examples as disclosed herein. For example, the communications manager 1120 may be configured as or otherwise support a means for transmitting, to a set of multiple target UEs, one or more PRS request messages via a sidelink channel. The communications manager 1120 may be configured as or otherwise support a means for receiving, from at least a first subset of the set of multiple target UEs located within a threshold distance from the initiating UE, one or more PRS response messages via the sidelink channel. The communications manager 1120 may be configured as or otherwise support a means for transmitting, via the sidelink channel, one or more first PRSs to each target UE in the first subset based on receiving the one or more PRS response messages from the first subset.

Additionally or alternatively, the communications manager 1120 may support wireless communications at a target UE in accordance with examples as disclosed herein. For example, the communications manager 1120 may be configured as or otherwise support a means for receiving, from an initiating UE via a sidelink channel, a PRS request message including an indication of a threshold distance from the initiating UE. The communications manager 1120 may be configured as or otherwise support a means for transmitting, to the initiating UE via the sidelink channel based on the target UE being located within the threshold distance from the initiating UE, a PRS response message. The communications manager 1120 may be configured as or otherwise support a means for receiving, via the sidelink channel, one or more first PRSs based on transmitting the PRS response message.

By including or configuring the communications manager 1120 in accordance with examples as described herein, the device 1105 may support techniques for may support techniques for distance-limited sidelink-based positioning which may increase power savings and extend battery life of the device 1105, while ensuring reliable and efficient communications. The techniques described herein may support high reliability and low latency communications, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of distance-limited sidelink-based positioning as described herein, or the processor 1140 and the memory 1130 may be otherwise configured to perform or support such operations.

Figure 12:
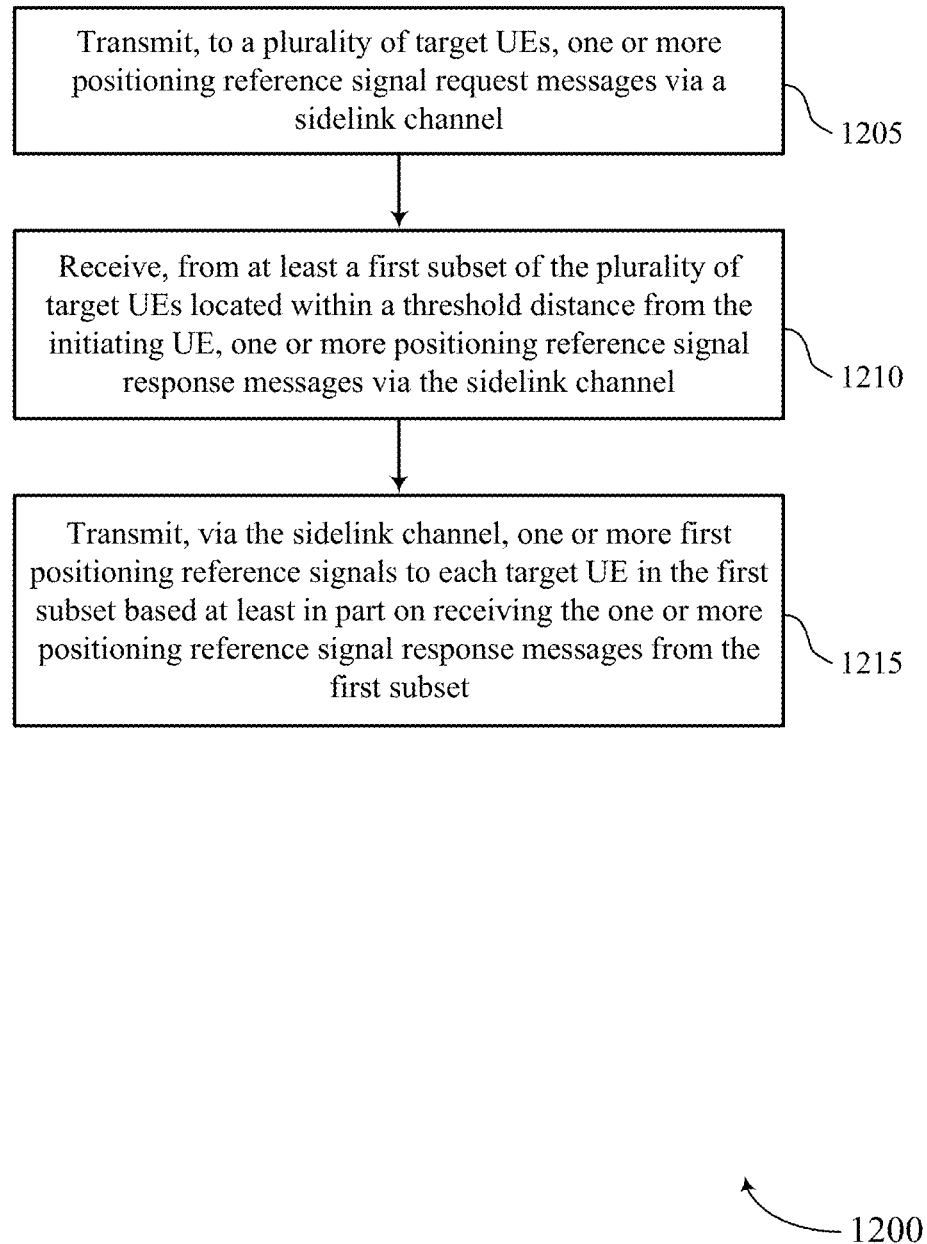
FIGS. 12 through 17 show flowcharts illustrating methods that support distance-limited sidelink-based positioning in accordance with aspects of the present disclosure.

FIG. 12 shows a flowchart illustrating a method 1200 that supports distance-limited sidelink-based positioning in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include transmitting, to a set of multiple target UEs, one or more PRS request messages via a sidelink channel. The operations of 1205 may be performed in accordance with examples as disclosed herein. In some examples, aspects of the operations of 1205 may be performed by an PRS request transmission component 1025 as described with reference to FIG. 10.

At 1210, the method may include receiving, from at least a first subset of the set of multiple target UEs located within a threshold distance from the initiating UE, one or more PRS response messages via the sidelink channel. The operations of 1210 may be performed in accordance with examples as disclosed herein. In some examples, aspects of the operations of 1210 may be performed by an PRS response reception component 1030 as described with reference to FIG. 10.

At 1215, the method may include transmitting, via the sidelink channel, one or more first PRSs to each target UE in the first subset based on receiving the one or more PRS response messages from the first subset. The operations of 1215 may be performed in accordance with examples as disclosed herein. In some examples, aspects of the operations of 1215 may be performed by an PRS transmission component 1035 as described with reference to FIG. 10.

Figure 13:
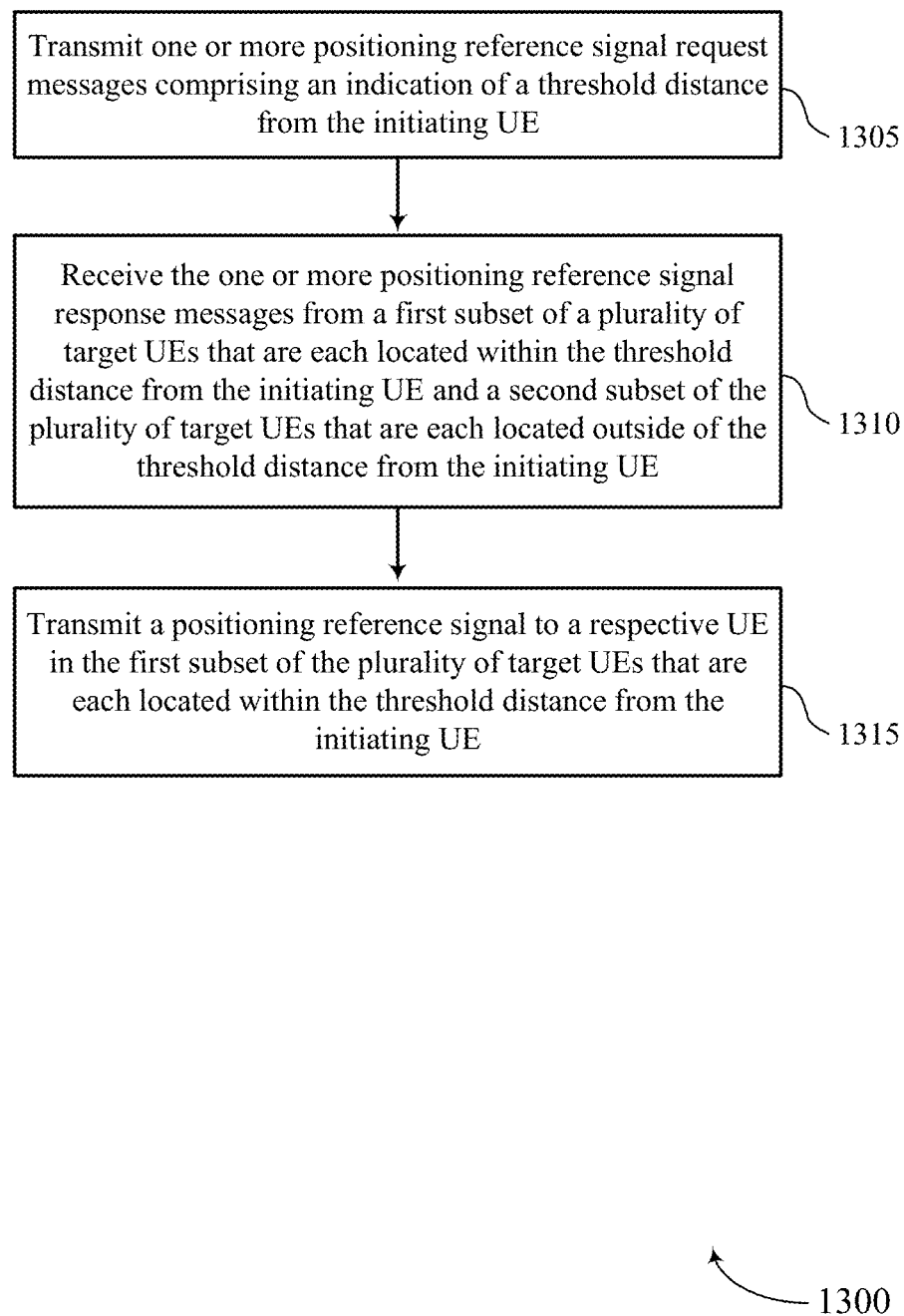

FIG. 13 shows a flowchart illustrating a method 1300 that supports distance-limited sidelink-based positioning in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include transmitting one or more PRS request messages including an indication of a threshold distance from the initiating UE. The operations of 1305 may be performed in accordance with examples as disclosed herein. In some examples, aspects of the operations of 1305 may be performed by a threshold distance component 1055 as described with reference to FIG. 10.

At 1310, the method may include receiving the one or more PRS response messages from a first subset of a set of multiple target UEs that are each located within the threshold distance from the initiating UE and a second subset of the set of multiple target UEs that are each located outside of the threshold distance from the initiating UE. The operations of 1310 may be performed in accordance with examples as disclosed herein. In some examples, aspects of the operations of 1310 may be performed by an PRS response reception component 1030 as described with reference to FIG. 10.

At 1315, the method may include transmitting a PRS to a respective UE in the first subset of the set of multiple target UEs that are each located within the threshold distance from the initiating UE. The operations of 1315 may be performed in accordance with examples as disclosed herein. In some examples, aspects of the operations of 1315 may be performed by an PRS transmission component 1035 as described with reference to FIG. 10.

Figure 14:
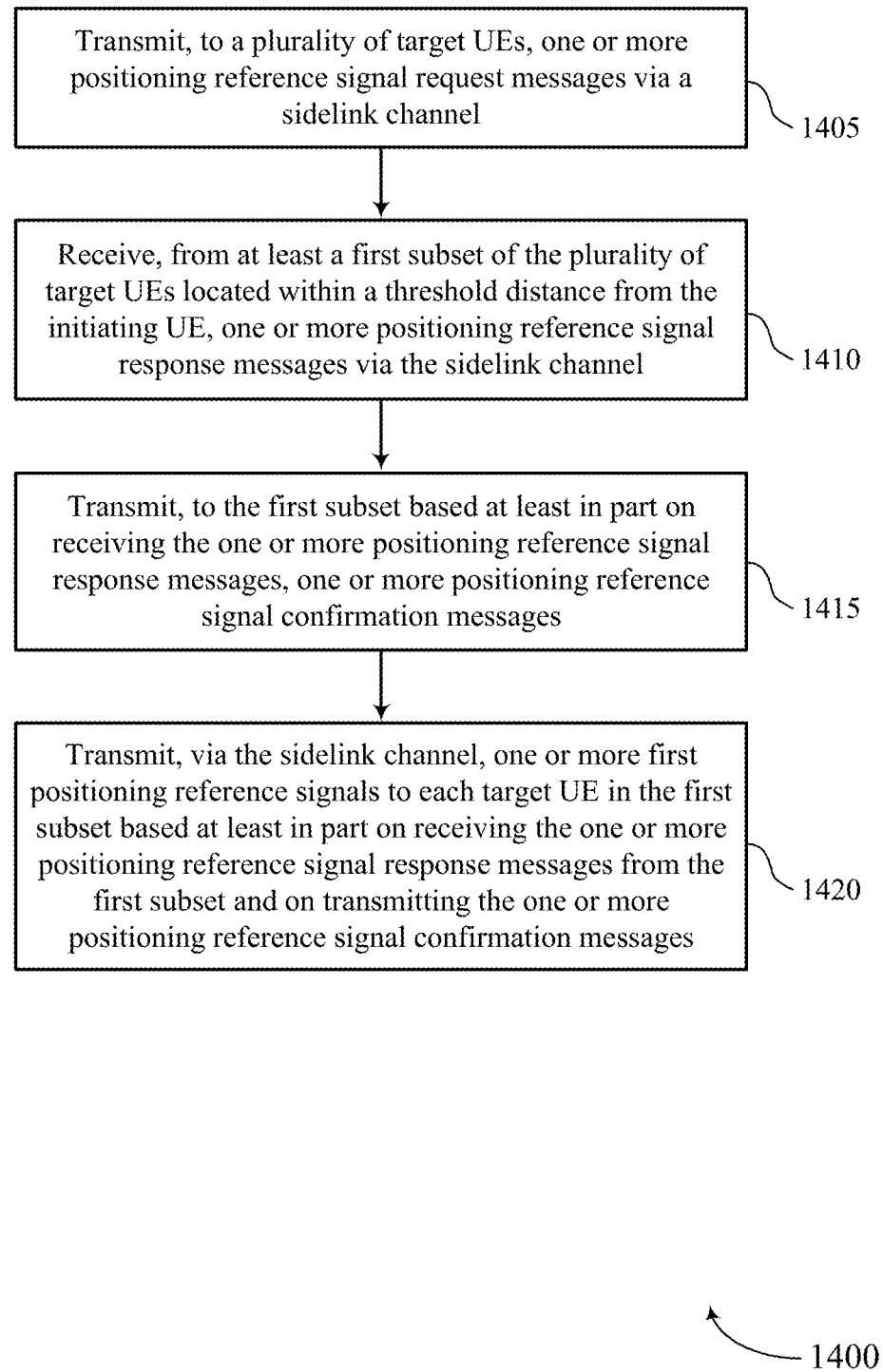

FIG. 14 shows a flowchart illustrating a method 1400 that supports distance-limited sidelink-based positioning in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include transmitting, to a set of multiple target UEs, one or more PRS request messages via a sidelink channel. The operations of 1405 may be performed in accordance with examples as disclosed herein. In some examples, aspects of the operations of 1405 may be performed by an PRS request transmission component 1025 as described with reference to FIG. 10.

At 1410, the method may include receiving, from at least a first subset of the set of multiple target UEs located within a threshold distance from the initiating UE, one or more PRS response messages via the sidelink channel. The operations of 1410 may be performed in accordance with examples as disclosed herein. In some examples, aspects of the operations of 1410 may be performed by an PRS response reception component 1030 as described with reference to FIG. 10.

At 1415, the method may include transmitting, to the first subset based on receiving the one or more PRS response messages, one or more PRS confirmation messages. The operations of 1415 may be performed in accordance with examples as disclosed herein. In some examples, aspects of the operations of 1415 may be performed by an PRS confirmation transmission component 1060 as described with reference to FIG. 10.

At 1420, the method may include transmitting, via the sidelink channel, one or more first PRSs to each target UE in the first subset based on receiving the one or more PRS response messages from the first subset and on transmitting the one or more PRS confirmation messages. The operations of 1420 may be performed in accordance with examples as disclosed herein. In some examples, aspects of the operations of 1420 may be performed by an PRS transmission component 1035 as described with reference to FIG. 10.

Figure 15:
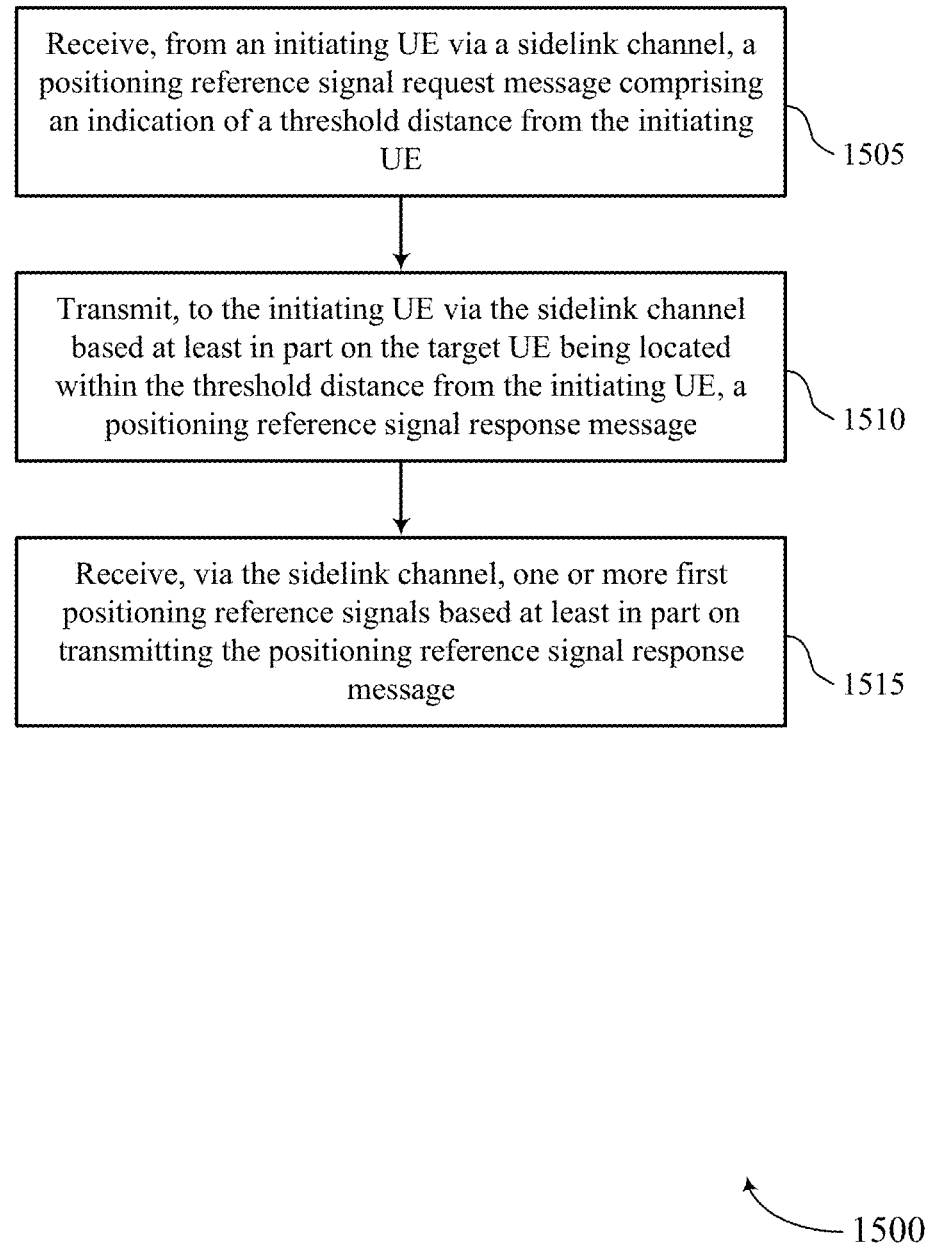

FIG. 15 shows a flowchart illustrating a method 1500 that supports distance-limited sidelink-based positioning in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving, from an initiating UE via a sidelink channel, a PRS request message including an indication of a threshold distance from the initiating UE. The operations of 1505 may be performed in accordance with examples as disclosed herein. In some examples, aspects of the operations of 1505 may be performed by an PRS request reception component 1040 as described with reference to FIG. 10.

At 1510, the method may include transmitting, to the initiating UE via the sidelink channel based on the target UE being located within the threshold distance from the initiating UE, a PRS response message. The operations of 1510 may be performed in accordance with examples as disclosed herein. In some examples, aspects of the operations of 1510 may be performed by an PRS response transmission component 1045 as described with reference to FIG. 10.

At 1515, the method may include receiving, via the sidelink channel, one or more first PRSs based on transmitting the PRS response message. The operations of 1515 may be performed in accordance with examples as disclosed herein. In some examples, aspects of the operations of 1515 may be performed by an PRS reception component 1050 as described with reference to FIG. 10.

Figure 16:
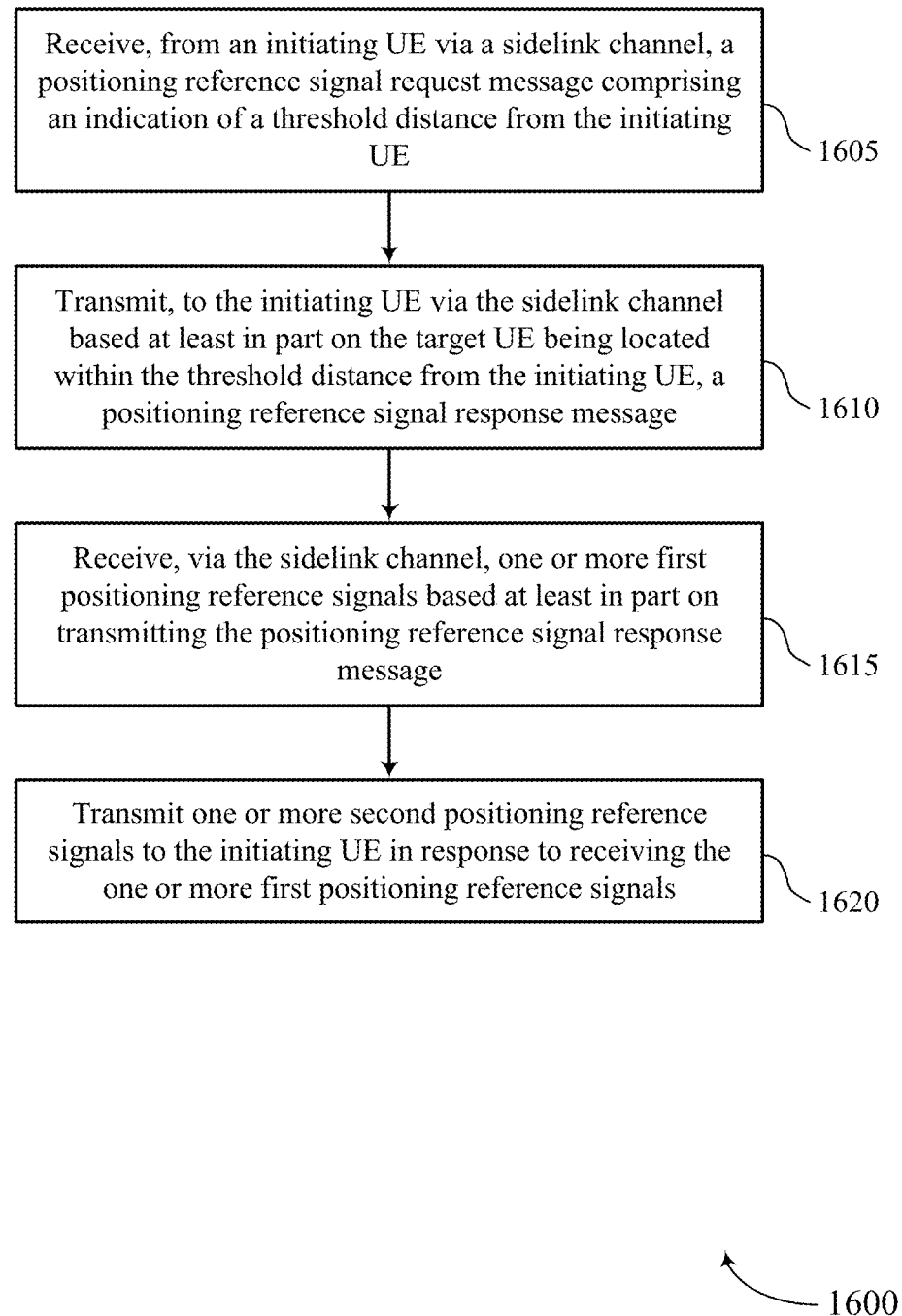

FIG. 16 shows a flowchart illustrating a method 1600 that supports distance-limited sidelink-based positioning in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from an initiating UE via a sidelink channel, a PRS request message including an indication of a threshold distance from the initiating UE. The operations of 1605 may be performed in accordance with examples as disclosed herein. In some examples, aspects of the operations of 1605 may be performed by an PRS request reception component 1040 as described with reference to FIG. 10.

At 1610, the method may include transmitting, to the initiating UE via the sidelink channel based on the target UE being located within the threshold distance from the initiating UE, a PRS response message. The operations of 1610 may be performed in accordance with examples as disclosed herein. In some examples, aspects of the operations of 1610 may be performed by an PRS response transmission component 1045 as described with reference to FIG. 10.

At 1615, the method may include receiving, via the sidelink channel, one or more first PRSs based on transmitting the PRS response message. The operations of 1615 may be performed in accordance with examples as disclosed herein. In some examples, aspects of the operations of 1615 may be performed by an PRS reception component 1050 as described with reference to FIG. 10.

At 1620, the method may include transmitting one or more second PRSs to the initiating UE in response to receiving the one or more first PRSs. The operations of 1620 may be performed in accordance with examples as disclosed herein. In some examples, aspects of the operations of 1620 may be performed by an PRS component 1065 as described with reference to FIG. 10.

Figure 17:
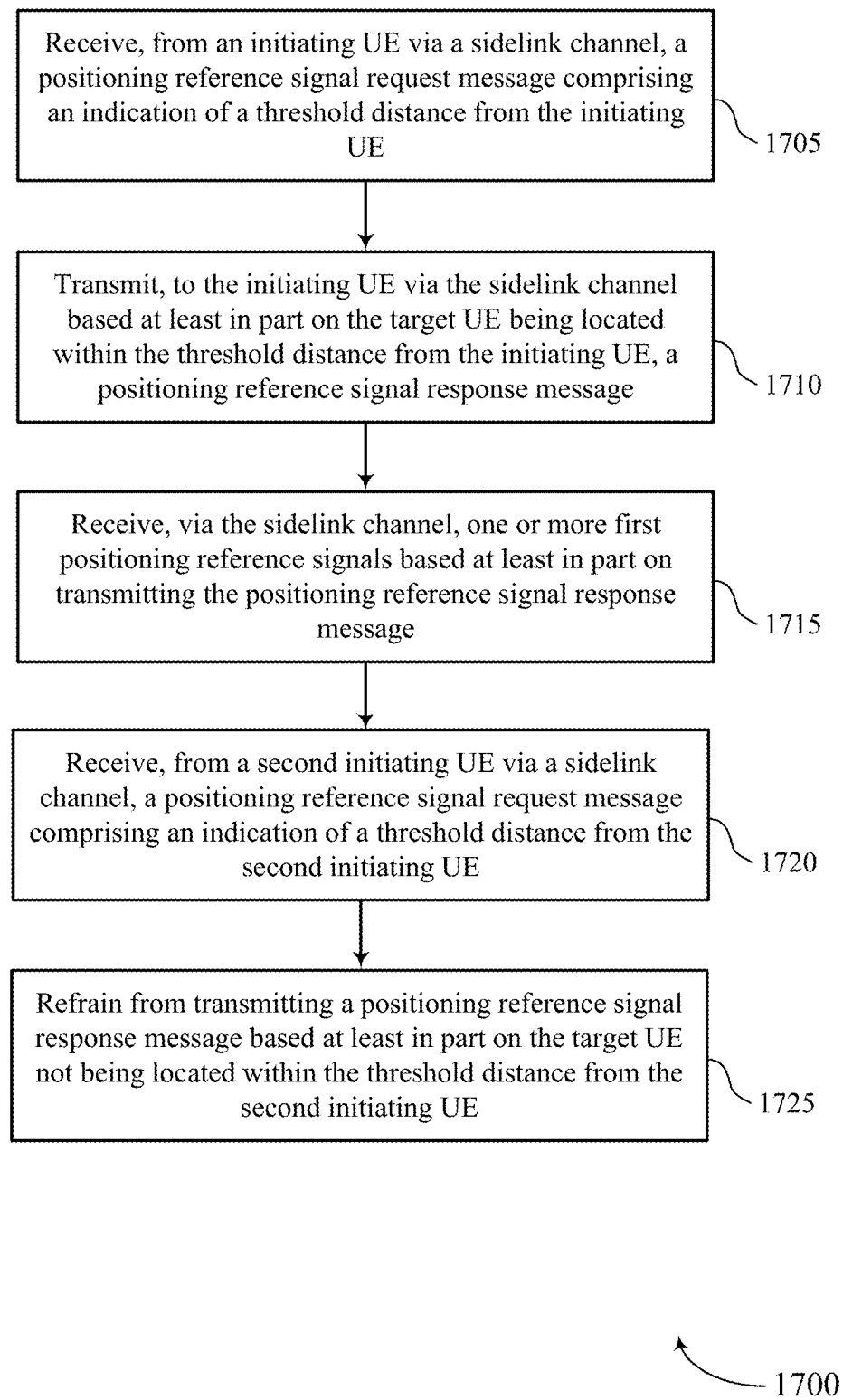

FIG. 17 shows a flowchart illustrating a method 1700 that supports distance-limited sidelink-based positioning in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from an initiating UE via a sidelink channel, a PRS request message including an indication of a threshold distance from the initiating UE. The operations of 1705 may be performed in accordance with examples as disclosed herein. In some examples, aspects of the operations of 1705 may be performed by an PRS request reception component 1040 as described with reference to FIG. 10.

At 1710, the method may include transmitting, to the initiating UE via the sidelink channel based on the target UE being located within the threshold distance from the initiating UE, a PRS response message. The operations of 1710 may be performed in accordance with examples as disclosed herein. In some examples, aspects of the operations of 1710 may be performed by an PRS response transmission component 1045 as described with reference to FIG. 10.

At 1715, the method may include receiving, via the sidelink channel, one or more first PRSs based on transmitting the PRS response message. The operations of 1715 may be performed in accordance with examples as disclosed herein. In some examples, aspects of the operations of 1715 may be performed by an PRS reception component 1050 as described with reference to FIG. 10.

At 1720, the method may include receiving, from a second initiating UE via a sidelink channel, a PRS request message including an indication of a threshold distance from the second initiating UE. The operations of 1720 may be performed in accordance with examples as disclosed herein. In some examples, aspects of the operations of 1720 may be performed by an PRS request reception component 1040 as described with reference to FIG. 10.

At 1725, the method may include refraining from transmitting a PRS response message based on the target UE not being located within the threshold distance from the second initiating UE. The operations of 1725 may be performed in accordance with examples as disclosed herein. In some examples, aspects of the operations of 1725 may be performed by an PRS response transmission component 1045 as described with reference to FIG. 10.

The following provides an overview of aspects of the present disclosure:

Aspect 1: A method for wireless communications at an initiating UE, comprising: transmitting, to a plurality of target UEs, one or more PRS request messages via a sidelink channel; receiving, from at least a first subset of the plurality of target UEs located within a threshold distance from the initiating UE, one or more PRS response messages via the sidelink channel; and transmitting, via the sidelink channel, one or more first PRSs to each target UE in the first subset based at least in part on receiving the one or more PRS response messages from the first subset.

Aspect 2: The method of aspect 1, wherein receiving the one or more PRS response messages further comprises: receiving the one or more PRS messages each comprising location information for a respective target UE of the plurality of target UEs.

Aspect 3: The method of aspect 2, wherein transmitting the one or more first PRSs to the first subset of the plurality of target UEs comprises: transmitting a PRS to a respective target UE in the first subset that are each determined to be located within the threshold distance based at least in part on the location information indicated in the one or more PRS response messages.

Aspect 4: The method of any of aspects 2 through 3, wherein receiving the one or more PRS response messages further comprises: receiving the one or more PRS response messages comprising the location information that indicates a zone identifier for a respective target UE.

Aspect 5: The method of any of aspects 2 through 4, wherein receiving the one or more PRS response messages further comprises: receiving the one or more PRS response messages comprising the location information that indicates a global positioning system coordinate for a respective target UE, one or more mobility parameters for the respective target UE, or any combination thereof.

Aspect 6: The method of any of aspects 1 through 5, wherein transmitting the one or more PRS request messages comprises: transmitting one or more PRS request messages comprising an indication of the threshold distance from the initiating UE.

Aspect 7: The method of aspect 6, wherein receiving the one or more PRS response messages comprises: receiving, from the first subset of the plurality of target UEs, the one or more PRS response messages based at least in part on each target UE in the first subset being located within the threshold distance from the initiating UE.

Aspect 8: The method of any of aspects 6 through 7, wherein the indication of the threshold distance comprises: a zone identifier for a geographical area, an indication of one or more zones within the threshold distance, a spatial distance, or any combination thereof.

Aspect 9: The method of any of aspects 6 through 8, wherein the indication of the threshold distance comprises: a global positioning system coordinate, one or more mobility parameters for the initiating UE, a radius value, a physical address based at least in part on a map location, one or more map coordinates, or any combination thereof.

Aspect 10: The method of any of aspects 1 through 9, wherein receiving the one or more PRS response messages comprises: receiving the one or more PRS response messages from the first subset of the plurality of target UEs that are each located within the threshold distance from the initiating UE and a second subset of the plurality of target UEs that are each located outside of the threshold distance from the initiating UE.

Aspect 11: The method of aspect 10, wherein transmitting the one or more first PRSs to the first subset of the plurality of target UEs further comprises: transmitting a PRS to a respective UE in the first subset of the plurality of target UEs that are each located within the threshold distance from the initiating UE.

Aspect 12: The method of any of aspects 1 through 11, wherein transmitting the one or more PRS request messages comprises: transmitting a broadcast sidelink message comprising the one or more PRS request messages to the plurality of target UEs.

Aspect 13: The method of any of aspects 1 through 12, further comprising: transmitting, to the first subset based at least in part on receiving the one or more PRS response messages, one or more PRS confirmation messages, wherein transmitting the one or more first PRSs is based at least in part on transmitting the one or more PRS confirmation messages.

Aspect 14: The method of any of aspects 1 through 13, wherein transmitting the one or more PRS request messages comprises: transmitting a plurality of unicast sidelink messages comprising the one or more PRS request messages to respective target UEs of the plurality of target UEs.

Aspect 15: The method of any of aspects 1 through 14, further comprising: receiving one or more second PRSs from each target UE in the first subset in response to transmitting the one or more first PRSs.

Aspect 16: A method for wireless communications at a target UE, comprising: receiving, from an initiating UE via a sidelink channel, a PRS request message comprising an indication of a threshold distance from the initiating UE; transmitting, to the initiating UE via the sidelink channel based at least in part on the target UE being located within the threshold distance from the initiating UE, a PRS response message; and receiving, via the sidelink channel, one or more first PRSs based at least in part on transmitting the PRS response message.

Aspect 17: The method of aspect 16, further comprising: transmitting one or more second PRSs to the initiating UE in response to receiving the one or more first PRSs.

Aspect 18: The method of any of aspects 16 through 17, further comprising: receiving, from the initiating UE based at least in part on transmitting the PRS response message, a PRS confirmation message, wherein receiving the one or more first PRSs is based at least in part on receiving the PRS confirmation message.

Aspect 19: The method of any of aspects 16 through 18, wherein receiving the PRS request message comprising the indication of the threshold distance from the initiating UE comprises: receiving an indication of a zone identifier for a geographical area in which the initiating UE is located, an indication of one or more zones, a spatial distance, or any combination thereof.

Aspect 20: The method of any of aspects 16 through 19, wherein receiving the PRS request message comprising the indication of the threshold distance from the initiating UE comprises: a global positioning system coordinate for the initiating UE, one or more mobility parameters for the initiating UE, a radius value, a physical address based at least in part on a map location, one or more map coordinates, or any combination thereof.

Aspect 21: The method of any of aspects 16 through 20, further comprising: receiving, from a second initiating UE via a sidelink channel, a PRS request message comprising an indication of a threshold distance from the second initiating UE; and refraining from transmitting a PRS response message based at least in part on the target UE not being located within the threshold distance from the second initiating UE.

Aspect 22: An apparatus for wireless communications at an initiating UE, comprising a processor; memory coupled with the processor; and instructions stored in the memory and executable by the processor to cause the apparatus to perform a method of any of aspects 1 through 15.

Aspect 23: An apparatus for wireless communications at an initiating UE, comprising at least one means for performing a method of any of aspects 1 through 15.

Aspect 24: A non-transitory computer-readable medium storing code for wireless communications at an initiating UE, the code comprising instructions executable by a processor to perform a method of any of aspects 1 through 15.

Aspect 25: An apparatus for wireless communications at a target UE, comprising a processor; memory coupled with the processor; and instructions stored in the memory and executable by the processor to cause the apparatus to perform a method of any of aspects 16 through 21.

Aspect 26: An apparatus for wireless communications at a target UE, comprising at least one means for performing a method of any of aspects 16 through 21.

Aspect 27: A non-transitory computer-readable medium storing code for wireless communications at a target UE, the code comprising instructions executable by a processor to perform a method of any of aspects 16 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at an initiating user equipment (UE), comprising:
   transmitting, to a plurality of target UEs via a sidelink channel, one or more positioning reference signal request messages comprising an indication of a threshold distance from the initiating UE;
   receiving, from at least a first subset of the plurality of target UEs located within the threshold distance from the initiating UE via the sidelink channel, one or more positioning reference signal response messages; and transmitting, via the sidelink channel, one or more first positioning reference signals to each target UE in the first subset based at least in part on receiving the one or more positioning reference signal response messages from the first subset.

2. The method of claim 1, wherein receiving the one or more positioning reference signal response messages further comprises:
receiving the one or more positioning reference signal response messages each comprising location information for a respective target UE of the plurality of target UEs.

3. The method of claim 2, wherein transmitting the one or more first positioning reference signals to the first subset of the plurality of target UEs comprises:
transmitting a positioning reference signal to a respective target UE in the first subset that is determined to be located within the threshold distance based at least in part on the location information indicated in the one or more positioning reference signal response messages.

4. The method of claim 2, wherein receiving the one or more positioning reference signal response messages further comprises:
receiving the one or more positioning reference signal response messages comprising the location information that indicates a zone identifier for a respective target UE.

5. The method of claim 2, wherein receiving the one or more positioning reference signal response messages further comprises:
receiving the one or more positioning reference signal response messages comprising the location information that indicates a global positioning system coordinate for a respective target UE, one or more mobility parameters for the respective target UE, or any combination thereof.

6. The method of claim 1, wherein receiving the one or more positioning reference signal response messages comprises:
receiving, from the first subset of the plurality of target UEs, the one or more positioning reference signal response messages based at least in part on each target UE in the first subset being located within the threshold distance from the initiating UE.

7. The method of claim 1, wherein the indication of the threshold distance comprises:
a zone identifier for a geographical area, an indication of one or more zones within the threshold distance, a spatial distance, or any combination thereof.

8. The method of claim 1, wherein the indication of the threshold distance comprises:
a global positioning system coordinate, one or more mobility parameters for the initiating UE, a radius value, a physical address based at least in part on a map location, one or more map coordinates, or any combination thereof.

9. The method of claim 1, wherein receiving the one or more positioning reference signal response messages comprises:
receiving the one or more positioning reference signal response messages from the first subset of the plurality of target UEs that are each located within the threshold distance from the initiating UE and a second subset of the plurality of target UEs that are each located outside of the threshold distance from the initiating UE.

10. The method of claim 9, wherein transmitting the one or more first positioning reference signals to the first subset of the plurality of target UEs further comprises:
transmitting a positioning reference signal to a respective UE in the first subset of the plurality of target UEs that are each located within the threshold distance from the initiating UE.

11. The method of claim 1, wherein transmitting the one or more positioning reference signal request messages comprises:
transmitting a broadcast sidelink message comprising the one or more positioning reference signal request messages to the plurality of target UEs.

12. The method of claim 1, further comprising:
transmitting, to the first subset based at least in part on receiving the one or more positioning reference signal response messages, one or more positioning reference signal confirmation messages, wherein transmitting the one or more first positioning reference signals is based at least in part on transmitting the one or more positioning reference signal confirmation messages.

13. The method of claim 1, wherein transmitting the one or more positioning reference signal request messages comprises:
transmitting a plurality of unicast sidelink messages comprising the one or more positioning reference signal request messages to respective target UEs of the plurality of target UEs.

14. The method of claim 1, further comprising:
receiving one or more second positioning reference signals from each target UE in the first subset in response to transmitting the one or more first positioning reference signals.

15. A method for wireless communications at a target user equipment (UE), comprising:
receiving, from an initiating UE via a sidelink channel, a positioning reference signal request message comprising an indication of a threshold distance from the initiating UE;
transmitting, to the initiating UE via the sidelink channel based at least in part on the target UE being located within the threshold distance from the initiating UE, a positioning reference signal response message; and
receiving, via the sidelink channel, one or more first positioning reference signals based at least in part on transmitting the positioning reference signal response message.

16. The method of claim 15, further comprising:
transmitting one or more second positioning reference signals to the initiating UE in response to receiving the one or more first positioning reference signals.

17. The method of claim 15, further comprising:
receiving, from the initiating UE based at least in part on transmitting the positioning reference signal response message, a positioning reference signal confirmation message, wherein receiving the one or more first positioning reference signals is based at least in part on receiving the positioning reference signal confirmation message.

18. The method of claim 15, wherein receiving the positioning reference signal request message comprising the indication of the threshold distance from the initiating UE comprises:
receiving an indication of a zone identifier for a geographical area in which the initiating UE is located, an indication of one or more zones, a spatial distance, or any combination thereof.

19. The method of claim 15, wherein receiving the positioning reference signal request message comprising the indication of the threshold distance from the initiating UE comprises:
a global positioning system coordinate for the initiating UE, one or more mobility parameters for the initiating UE, a radius value, a physical address based at least in part on a map location, one or more map coordinates, or any combination thereof.

20. The method of claim 15, further comprising:
receiving, from a second initiating UE via a sidelink channel, a positioning reference signal request message comprising an indication of a threshold distance from the second initiating UE; and
refraining from transmitting a positioning reference signal response message based at least in part on the target UE not being located within the threshold distance from the second initiating UE.

21. An apparatus for wireless communications at an initiating user equipment (UE), comprising:
a processor;
memory coupled with the processor; and
instructions stored in the memory and executable by the processor to cause the apparatus to:
transmit, to a plurality of target UEs via a sidelink channel, one or more positioning reference signal request messages comprising an indication of a threshold distance from the initiating UE;
receive, from at least a first subset of the plurality of target UEs located within the threshold distance from the initiating UE via the sidelink channel, one or more positioning reference signal response messages; and
transmit, via the sidelink channel, one or more first positioning reference signals to each target UE in the first subset based at least in part on receiving the one or more positioning reference signal response messages from the first subset.

22. The apparatus of claim 21, further comprising a receiver, wherein the instructions to receive the one or more positioning reference signal response messages are further executable by the processor to cause the apparatus to:
receive, via the receiver, the one or more positioning reference signal response messages each comprising location information for a respective target UE of the plurality of target UEs.

23. The apparatus of claim 22, further comprising a transmitter, wherein the instructions to transmit the one or more first positioning reference signals to the first subset of the plurality of target UEs are executable by the processor to cause the apparatus to:
transmit, via the transmitter, a positioning reference signal to a respective target UE in the first subset that is determined to be located within the threshold distance based at least in part on the location information indicated in the one or more positioning reference signal response messages.

24. The apparatus of claim 22, wherein the instructions to receive the one or more positioning reference signal response messages are further executable by the processor to cause the apparatus to:
receive the one or more positioning reference signal response messages comprising the location information that indicates a zone identifier for a respective target UE.

25. The apparatus of claim 22, wherein the instructions to receive the one or more positioning reference signal response messages are further executable by the processor to cause the apparatus to:
receive the one or more positioning reference signal response messages comprising the location information that indicates a global positioning system coordinate for a respective target UE, one or more mobility parameters for the respective target UE, or any combination thereof.

26. An apparatus for wireless communications at a target user equipment (UE), comprising:
a processor;
memory coupled with the processor; and
instructions stored in the memory and executable by the processor to cause the apparatus to:
receive, from an initiating UE via a sidelink channel, a positioning reference signal request message comprising an indication of a threshold distance from the initiating UE;
transmit, to the initiating UE via the sidelink channel based at least in part on the target UE being located within the threshold distance from the initiating UE, a positioning reference signal response message; and
receive, via the sidelink channel, one or more first positioning reference signals based at least in part on transmitting the positioning reference signal response message.

27. The apparatus of claim 26, further comprising a transmitter, wherein the instructions are further executable by the processor to cause the apparatus to:
transmit, via the transmitter, one or more second positioning reference signals to the initiating UE in response to receiving the one or more first positioning reference signals.

28. The apparatus of claim 26, further comprising a receiver, wherein the instructions are further executable by the processor to cause the apparatus to:
receive, via the receiver from the initiating UE based at least in part on transmitting the positioning reference signal response message, a positioning reference signal confirmation message, wherein receiving the one or more first positioning reference signals is based at least in part on receiving the positioning reference signal confirmation message.

29. The apparatus of claim 26, wherein the instructions to receive the positioning reference signal request message comprising the indication of the threshold distance from the initiating UE are executable by the processor to cause the apparatus to:
receive an indication of a zone identifier for a geographical area in which the initiating UE is located, an indication of one or more zones, a spatial distance, or any combination thereof.

* * * * *